US011468293B2

(12) United States Patent
Chudak

(10) Patent No.: US 11,468,293 B2
(45) Date of Patent: Oct. 11, 2022

(54) SIMULATING AND POST-PROCESSING USING A GENERATIVE ADVERSARIAL NETWORK

(71) Applicant: D-WAVE SYSTEMS INC., Burnaby (CA)

(72) Inventor: Fabian A. Chudak, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 385 days.

(21) Appl. No.: 16/714,103

(22) Filed: Dec. 13, 2019

(65) Prior Publication Data

US 2020/0193272 A1 Jun. 18, 2020

Related U.S. Application Data

(60) Provisional application No. 62/780,029, filed on Dec. 14, 2018.

(51) Int. Cl.
*G06N 3/04* (2006.01)
*G06N 10/00* (2022.01)
(Continued)

(52) U.S. Cl.
CPC .......... *G06N 3/0454* (2013.01); *G06N 3/06* (2013.01); *G06N 3/088* (2013.01); *G06N 10/00* (2019.01); *G06F 17/11* (2013.01)

(58) Field of Classification Search
None
See application file for complete search history.

(56) References Cited

U.S. PATENT DOCUMENTS 3,470,828 A 10/1969 Powell et al.
6,671,661 B1 12/2003 Bishop
(Continued)

FOREIGN PATENT DOCUMENTS

CA 2984773 A1 12/2016
CN 101473346 A 7/2009
(Continued)

OTHER PUBLICATIONS

Adachi, S.H et al., "Application of Quantum Annealing to Training of Deep Neural Networks," URL:https://arxiv.org/ftp/arxiv/papers/151 0/1510.06356.pdf, Oct. 21, 2015, 18 pages.
(Continued)

*Primary Examiner* — Jany Richardson
(74) *Attorney, Agent, or Firm* — Cozen O'Connor

(57) ABSTRACT

A hybrid computing system comprising a quantum computer and a digital computer employs a digital computer to use machine learning methods for post-processing samples drawn from the quantum computer. Post-processing samples can include simulating samples drawn from the quantum computer. Machine learning methods such as generative adversarial networks (GANs) and conditional GANs are applied. Samples drawn from the quantum computer can be a target distribution. A generator of a GAN generates samples based on a noise prior distribution and a discriminator of a GAN measures the distance between the target distribution and a generative distribution. A generator parameter and a discriminator parameter are respectively minimized and maximized.

20 Claims, 3 Drawing Sheets

(51) Int. Cl.
*G06N 3/06* (2006.01)
*G06N 3/08* (2006.01)
*G06F 17/11* (2006.01)

(56) References Cited

U.S. PATENT DOCUMENTS

| | | | |
|---|---|---|---|
| 7,135,701 | B2 | 11/2006 | Amin et al. |
| 7,418,283 | B2 | 8/2008 | Amin |
| 7,493,252 | B1 | 2/2009 | Nagano et al. |
| 7,533,068 | B2 | 5/2009 | Maassen et al. |
| 7,876,248 | B2 | 1/2011 | Berkley et al. |
| 8,008,942 | B2 | 8/2011 | Van et al. |
| 8,035,540 | B2 | 10/2011 | Berkley et al. |
| 8,073,808 | B2 | 12/2011 | Rose |
| 8,190,548 | B2 | 5/2012 | Choi |
| 8,195,596 | B2 | 6/2012 | Rose et al. |
| 8,244,650 | B2 | 8/2012 | Rose |
| 8,340,439 | B2 | 12/2012 | Mitarai et al. |
| 8,421,053 | B2 | 4/2013 | Bunyk et al. |
| 8,863,044 | B1 | 10/2014 | Casati et al. |
| 9,378,733 | B1 | 6/2016 | Vanhoucke et al. |
| D795,416 | S | 8/2017 | Blomberg et al. |
| 9,727,824 | B2 | 8/2017 | Rose et al. |
| 10,296,846 | B2 | 5/2019 | Csurka et al. |
| 10,318,881 | B2 | 6/2019 | Rose et al. |
| 10,339,466 | B1 | 7/2019 | Ding et al. |
| 10,817,796 | B2 | 10/2020 | Macready et al. |
| 2002/0010691 | A1 | 1/2002 | Chen |
| 2003/0030575 | A1 | 2/2003 | Frachtenberg et al. |
| 2005/0119829 | A1 | 6/2005 | Bishop et al. |
| 2006/0041421 | A1 | 2/2006 | Ta et al. |
| 2006/0047477 | A1 | 3/2006 | Bachrach |
| 2006/0074870 | A1 | 4/2006 | Brill et al. |
| 2006/0115145 | A1 | 6/2006 | Bishop et al. |
| 2007/0011629 | A1 | 1/2007 | Shacham et al. |
| 2007/0162406 | A1 | 7/2007 | Lanckriet |
| 2008/0069438 | A1 | 3/2008 | Winn et al. |
| 2008/0103996 | A1 | 5/2008 | Forman et al. |
| 2008/0132281 | A1 | 6/2008 | Kim et al. |
| 2008/0176750 | A1 | 7/2008 | Rose et al. |
| 2008/0215850 | A1 | 9/2008 | Berkley et al. |
| 2008/0313430 | A1 | 12/2008 | Bunyk |
| 2009/0077001 | A1 | 3/2009 | Macready et al. |
| 2009/0121215 | A1 | 5/2009 | Choi |
| 2009/0171956 | A1 | 7/2009 | Gupta et al. |
| 2009/0254505 | A1 | 10/2009 | Davis et al. |
| 2009/0278981 | A1 | 11/2009 | Bruna et al. |
| 2009/0322871 | A1 | 12/2009 | Ji et al. |
| 2010/0010657 | A1 | 1/2010 | Do et al. |
| 2010/0185422 | A1 | 7/2010 | Hoversten |
| 2010/0228694 | A1 | 9/2010 | Le et al. |
| 2010/0332423 | A1 | 12/2010 | Kapoor et al. |
| 2011/0022369 | A1 | 1/2011 | Carroll et al. |
| 2011/0022820 | A1 | 1/2011 | Bunyk et al. |
| 2011/0044524 | A1 | 2/2011 | Wang et al. |
| 2011/0047201 | A1 | 2/2011 | Macready et al. |
| 2011/0142335 | A1 | 6/2011 | Ghanem et al. |
| 2011/0231462 | A1 | 9/2011 | Macready et al. |
| 2011/0238378 | A1 | 9/2011 | Allen et al. |
| 2011/0295845 | A1 | 12/2011 | Gao et al. |
| 2012/0084235 | A1 | 4/2012 | Suzuki et al. |
| 2012/0124432 | A1 | 5/2012 | Pesetski et al. |
| 2012/0149581 | A1 | 6/2012 | Fang |
| 2012/0215821 | A1 | 8/2012 | Macready et al. |
| 2012/0254586 | A1 | 10/2012 | Amin et al. |
| 2013/0097103 | A1 | 4/2013 | Chari et al. |
| 2013/0236090 | A1 | 9/2013 | Porikli et al. |
| 2013/0245429 | A1 | 9/2013 | Zhang et al. |
| 2014/0025606 | A1 | 1/2014 | Macready |
| 2014/0040176 | A1 | 2/2014 | Balakrishnan et al. |
| 2014/0152849 | A1 | 6/2014 | Bala et al. |
| 2014/0187427 | A1 | 7/2014 | Macready et al. |
| 2014/0201208 | A1 | 7/2014 | Satish et al. |
| 2014/0214835 | A1 | 7/2014 | Oehrle et al. |
| 2014/0214836 | A1 | 7/2014 | Stivoric et al. |
| 2014/0297235 | A1 | 10/2014 | Arora et al. |
| 2015/0006443 | A1 | 1/2015 | Rose et al. |
| 2015/0161524 | A1 | 6/2015 | Hamze |
| 2015/0242463 | A1 | 8/2015 | Lin et al. |
| 2015/0248586 | A1 | 9/2015 | Gaidon et al. |
| 2015/0269124 | A1 | 9/2015 | Hamze et al. |
| 2015/0317558 | A1 | 11/2015 | Adachi et al. |
| 2016/0019459 | A1 | 1/2016 | Audhkhasi et al. |
| 2016/0042294 | A1 | 2/2016 | Macready et al. |
| 2016/0078600 | A1 | 3/2016 | Perez Pellitero et al. |
| 2016/0110657 | A1 | 4/2016 | Gibiansky et al. |
| 2016/0191627 | A1 | 6/2016 | Huang et al. |
| 2016/0307305 | A1 | 10/2016 | Madabhushi et al. |
| 2017/0132509 | A1 | 5/2017 | Li et al. |
| 2017/0255871 | A1 | 9/2017 | Macready et al. |
| 2017/0300817 | A1 | 10/2017 | King et al. |
| 2017/0357274 | A1 | 12/2017 | Baughman et al. |
| 2018/0018584 | A1 | 1/2018 | Nock et al. |
| 2018/0025291 | A1 | 1/2018 | Dey et al. |
| 2018/0065749 | A1 | 3/2018 | Cantrell et al. |
| 2018/0137422 | A1 | 5/2018 | Wiebe et al. |
| 2018/0157923 | A1 | 6/2018 | El Kaliouby et al. |
| 2018/0165554 | A1 | 6/2018 | Zhang et al. |
| 2018/0165601 | A1 | 6/2018 | Wiebe et al. |
| 2019/0005402 | A1 | 1/2019 | Mohseni et al. |
| 2019/0018933 | A1 | 1/2019 | Oono et al. |
| 2019/0180147 | A1 | 6/2019 | Zhang et al. |
| 2020/0410384 | A1* | 12/2020 | Aspuru-Guzik ......... G06N 7/08 |

FOREIGN PATENT DOCUMENTS

| | | |
|---|---|---|
| CN | 101657827 A | 2/2010 |
| CN | 102324047 A | 1/2012 |
| CN | 102364497 A | 2/2012 |
| CN | 102651073 A | 8/2012 |
| CN | 102831402 A | 12/2012 |
| CN | 102324047 B | 6/2013 |
| CN | 102364497 B | 6/2013 |
| CN | 104050509 A | 9/2014 |
| CN | 102037475 B | 5/2015 |
| CN | 104766167 A | 7/2015 |
| CN | 104919476 A | 9/2015 |
| CN | 106569601 A | 4/2017 |
| JP | 2011008631 A | 1/2011 |
| KR | 20130010181 A | 1/2013 |
| WO | 2009120638 A2 | 10/2009 |
| WO | 2010071997 A1 | 7/2010 |
| WO | 2015193531 A1 | 12/2015 |
| WO | 2016029172 A1 | 2/2016 |
| WO | 2016089711 A1 | 6/2016 |
| WO | 2016210018 A1 | 12/2016 |
| WO | 2017031356 A1 | 2/2017 |
| WO | 2017031357 A1 | 2/2017 |
| WO | 2017124299 A1 | 7/2017 |
| WO | 2017132545 A1 | 8/2017 |

OTHER PUBLICATIONS

Amin, "Effect of Local Minima on Adiabatic Quantum Optimization," Physical Review Letters 100(130503), 2008, 4 pages.

Bach et al., "On the Equivalence between Herding and Conditional Gradient Algorithms," Proceedings of the 29th International Conference on Machine Learning, 2012, 8 pages.

Bach, F. et al., "Optimization with Sparsity-Inducing Penalties," arXiv:1108.0775v2 [cs.LG], Nov. 22, 2011, 116 pages.

Berkley, A.J. et al., "Tunneling Spectroscopy Using a Probe Qubit," arXiv:1210.6310v2 [cond-mat.supr-con], Jan. 3, 2013, 5 pages.

Brakel, P., Dieleman, S., & Schrauwen. "Training restricted Boltzmann machines with multi-tempering: Harnessing parallelization", 2012.

Chen et al., "Herding as a Learning System with Edge-of-Chaos Dynamics," arXiv:1602.030142V2 [stat.ML], Mar. 1, 2016, 48 pages.

Chen et al., "Parametric Herding," Proceedings of the 13th International Conference on Artificial Intelligence and Statistics (AISTATS), 2010, pp. 97-104.

Chinese Office Action for Application No. CN 2016800606343, dated May 8, 2021, 21 pages (with English translation).

(56) References Cited

OTHER PUBLICATIONS

Courville, A. et al., "A Spike and Slab Restricted Boltzmann Machine," Proceedings of the 14th International Conference on Artificial Intelligence and Statistics (AISTATS), 2011, 9 pages.
Deng, J. et al., "ImageNet: A Large-Scale Hierarchical Image Database," Proceedings / CVPR, IEEE Computer Society Conference on Computer Vision and Pattern Recognition, 2009, 8 pages.
Desjardins, G., Courville, A., Bengio, Y., Vincent, P., & Delalleau, O. "Parallel tempering for training of restricted Boltzmann machines", 2010.
Dumoulin, V. et al., "On the Challenges of Physical Implementations of RBMs," Proceedings of the 28th AAAI Conference on Artificial Intelligence, vol. 2, Jul. 27, 2014, 7 pages.
Dumoulin, Vincent, et al. "On the Challenges of Physical implementations of RBMs". arXiv:1312.5258v1, Dec. 13, 2013.
Elkan, C., "Learning Classifiers from Only Positive and Unlabeled Data," KDD08: The 14th ACM SIGKDD International Conference on Knowledge Discovery and Data Mining Las Vegas Nevada USA Aug. 24-27, 2008, 8 pages.
Extended European Search Report for EP Application No. 16837862.8, dated Apr. 3, 2019, 12 pages.
Fergus, R. et al., "Semi-Supervised Learning in Gigantic Image Collections," Advances in Neural Information Processing Systems, vol. 22, 2009, 8 pages.
First Office Action dated Nov. 29, 2021 in CN App No. 2016800731803. (English Translation).
First Office Action issued in Chinese No. 2018101287473 with English translation, dated Jul. 12, 2021, 16 pages.
Freidman, et al., "Learning Bayesian Networks from Data", Internet Movie Database, http://www.imdb.com, 19 pages.
Freund, Y. et al., "Large Margin Classification Using the Perceptron Algorithm," Machine Learning 37(3), 1999, 19 pages.
Fung, G. et al., "Parameter Free Bursty Events Detection in Text Streams," Proceedings of the 31st VLDB Conference, Trondheim, Norway, 2005, 12 pages.
Geordie, "First Ever DBM Trained Using a Quantum Computer," URL:https://dwave.wordpress.com/2014/01/06 /first-ever-dbm-trained-using-a-quantum-computer/, Jan. 6, 2014, 8 pages.
Geordie, "Training DBMs with Physical neural nets" In Hack The Multiverse, Jan. 24, 2014, pp. 2-5.
Gómez-Bombarelli et al., "Automatic Chemical Design Using a Data-Driven Continuous Representation of Molecules," arXiv:1610.02415v3: Dec. 2017. (26 pages).
Grassberger, "Entropy Estimates from Insufficient Samplings," arXiv:physics/0307138v2 [physics.data-an], Jan. 4, 2008, 5 pages.
Hinton et al., "A Practical Guide to Training Restricted Boltzmann Machines," Springer, pp. 599-619, Jan. 1, 2012.
International Search Report and Written Opinion for PCT/US2018/065286, dated Apr. 16, 2019, 11 pages.
International Search Report and Written Opinion for PCT/US2019/017124, dated May 30, 2019, 28 pages.
International Search Report and Written Opinion of the International Searching Authority, dated Jan. 4, 2018, for International Application No. PCT/US2017/053303, 16 pages.
International Search Report and Written Opinion, dated Oct. 13, 2014, for international Application No. PCT/US2014/044421, 13 pages.
Dumoulin, Vincent , et al., "On the Challenges of Physical Implementations of RBMs", https://arxiv.org/abs/1312.5258v2, Oct. 24, 2014.
Humphrys, M. , http://computing.dcu.ie/ humphrys/PhD/ch2.html.
Kingma, Diedrik , et al., "Auto-Encoding Variational Bayes", https://arxiv.org/abs/1312.6114v10, May 1, 2014.
Molchanov, Dmitry , et al., "Variational Dropout Sparsities Deep Neural Networks", https://arxiv.org/pdf/1701.05369v1.pdf, Jan. 19, 2017.
Goodfellow, Ian J., et al., "Generative Adversarial Nets", arXiv:1406.2661v1 [stat.ML], 9 pages., Jun. 10, 2014.

Hjelm, R. Devon, et al., "Boundary-Seeking Generative Adversarial Networks", arXiv:1702.08431v4 [stat.ML], 17 pages., Feb. 21, 2018.
Mirza Mehdi, et al., "Conditional Generative Adversarial Nets", arXiv:1411.1784v1 [cs.LG], 7 pages., Nov. 6, 2014.
Nowozin, Sebastian , et al., "f-GAN: Training Generative Neural Samplers using Variational Divergence Minimization", arXiv:1606.00709v1 [stat ML], 17 pages., Jun. 2, 2016.
International Search Report, dated May 10, 2017, for International Application No. PCT/US2017/015401, 3 pages.
International Search Report, dated Nov. 18, 2016, for International Application No. PCT/US2016/047627, 3 pages.
Jaakkola et al., "Improving the Mean Field Approximation Via the Use of Mixture Distributions," 1998, 11 pages.
Japanese Office Action for Application No. JP 2019516164, dated Nov. 24, 2021, 33 pages (including English translation).
Jenatton, R. et al., "Proximal Methods for Hierarchical Sparse Coding," arXiv:1009.2139v4 [stat.ML], Jul. 5, 2011, 38 pages.
Katzgraber et al., "Glassy Chimeras Could Be Blind to Quantum Speedup: Designing Better Benchmarks for Quantum Annealing Machines," Physical Review X(4):021008, 2014. (8 pages).
Khalek, S. et al., "Automated SQL Query Generation for Systematic Testing of Database Engines," ASE '10 Proceedings of the IEEE/ACM international conference on Automated software engineering, 2010, 4 pages.
Korean Office Action for Application 10-2019-7012141, dated Nov. 29, 2021, 18 pages (including English translation).
Krähenbühl, P. et al., "Efficient Inference in Fully Connected CRFs with Gaussian Edge Potentials," arXiv:1210.5644 [cs.CV], 2012, 9 pages.
Kuželka, O. et al., "Fast Estimation of First-Order Clause Coverage through Randomization and Maximum Likelihood," ICML '08: Proceedings of the 25th international conference on Machine learning, 2008, 8 pages.
Lafferty, J. et al., "Conditional Random Fields: Probabilistic Models for Segmenting and Labeling Sequence Data," Proceedings of the 18th International Conference on Machine Learning 2001,10 pages.
Li, X., et al., "Collaborative Variational Autoencoder for Recommender Systems," Published in KDD, Halifax, NS, Canada, Aug. 13-17, 2017, pp. 305-314.
Minh, V. et al., "Learning to Label Aerial Images from Noisy Data," Proceedings of the 29th International Conference on Machine Learning, Edinburgh, Scotland, 2012, 8 pages.
Miyata et al., "Consideration of 2D-FFT by Decomposition-of-Large Scale Data on Multi-GPU", IEICE Technical Report, vol. 114 No. 155, Computer Systems Jul. 28-30, 2014, Abstract, 12 pages.
Mocanu et al., "A topological insight into restricted Boltzmann machines," Pre-print version: arXiv:1604.05978v2: Jul. 2016. (25 pages).
Murray, I. et al., "Bayesian Learning in Undirected Graphical Models: Approximate MCMC Algorithms," UAI '04: Proceedings of the 20th conference on Uncertainty in Artificial Intelligence, 2004, 8 pages.
Natarajan, N. et al., "Learning with Noisy Labels," Advances in Neural Information Processing Systems 26, 2013, 9 pages.
Neven, H. et al., "QBoost: Large Scale Classifier Training with Adiabatic Quantum Optimization," JMLR: Workshop and Conference Proceedings 25, 2012, 16 pages.
Niv, "Reinforcement Learning in the Brain". Journal of Mathematical Psychology, 2009—Elsevier.
Paninski, "Estimation of Entropy and Mutual Information," Neural Computation 15:1191-1253, 2003.
Prakash, "Quantum Algorithms for Linear Algebra and Machine Learning," Doctoral Thesis, Technical Report No. UCB/EECS-2014-211, University of California at Berkeley, 2014, pp. 1-9.
Quattoni, A. et al., "Hidden Conditional Random Fields," IEEE Transactions on Pattern Analysis and Machine Intelligence, 29(10), 2007, 6 pages.
Reed et al., "Training Deep Neural Networks on Noisy Labels with Bootstrapping," arXiv:1412.6596v3 [cs.CV] Apr. 15, 2015, 11 pages.

(56) References Cited

OTHER PUBLICATIONS

Rezende et al., "Stochastic Backpropagation and Approximate Inference in Deep Generative Models," arXiv:1401.4082v3 [stat.ML] May 30, 2014, 14 pages.
Rolfe et al., "Discrete Variational Auto-Encoder Systems and Methods for Machine Learning Using Adiabatic Quantum Computers," U.S. Appl. No. 62/462,821, filed Feb. 23, 2017, 113 pages.
Rolfe et al., "Discrete Variational Auto-Encoder Systems and Methods for Machine Learning Using Adiabatic Quantum Computers," U.S. Appl. No. 62/404,591, filed Oct. 5, 2016, 87 pages.
Rolfe et al., "Systems and Methods for Machine Learning Using Adiabatic Quantum Computers," U.S. Appl. No. 62/207,057, filed Aug. 19, 2015, 39 pages.
Rolfe, "Discrete Variational Auto-Encoder Systems and Methods for Machine Learning Using Adiabatic Quantum Computers," U.S. Appl. No. 62/206,974, filed Aug. 19, 2015, 43 pages.
Rolfe, "Discrete Variational Auto-Encoder Systems and Methods for Machine Learning Using Adiabatic Quantum Computers," U.S. Appl. No. 62/268,321, filed Dec. 16, 2015, 52 pages.
Rolfe, "Discrete Variational Auto-Encoder Systems and Methods for Machine Learning Using Adiabatic Quantum Computers," U.S. Appl. No. 62/307,929, filed Mar. 14, 2016, 67 pages.
Rose et al., "First ever DBM trained using a quantum computer", Hack the Multiverse, Programming quantum computers for fun and profit, XP-002743440, Jan. 6, 2014, 8 pages.
Sakkaris, et al., "QuDot Nets: Quantum Computers and Bayesian Networks", arXiv:1607.07887v1 [quant-ph] Jul. 26, 2016, 22 page.
Scarselli, F. et al., "The Graph Neural Network Model," IEEE Transactions on Neural Networks, vol. 20, No. 1,2009, 22 pages.
Spall, "Multivariate Stochastic Approximation Using a Simultaneous Perturbation Gradient Approximation," IEEE Transactions on Automatic Control 37(3):332-341, 1992.
Strub, F., et al. "Hybrid Collaborative Filtering with Autoencoders," arXiv:1603.00806v3 [cs.IR], Jul. 19, 2016, 10 pages.
Sukhbaatar et al., "Training Convolutional Networks with Noisy Labels," arXiv:1406.2080v4 [cs.CV] Apr. 10, 2015, 11 pages.
Suzuki, "Natural quantum reservoir computing for temporal information processing", Scientific Reports, Nature Portfolio, Jan. 25, 2022.
Tieleman, T., "Training Restricted Boltzmann Machines using Approximation to the Likelihood Gradient," ICML '08: Proceedings of the 25th international conference on Machine learning, 2008, 8 pages.
Tucci, "Use of a Quantum Computer to do Importance and Metropolis-Hastings Sampling of a Classical Bayesian Network", arXiv:0811.1792v1 [quant-ph] Nov. 12, 2008, 41 pages.
Van Baalen, M. "Deep Matrix Factorization for Recommendation," Master's Thesis, Univ.of Amsterdam, Sep. 30, 2016, URL: https://scholar.google.co.kr/scholar?q=Deep+Matrix+Factorization+for+Recommendation&hl=ko&as_sdt=O&as_vis=l&oi=scholar, 99 pages.
Van de Meent, J-W., Paige, B., & Wood, "Tempering by subsampling", 2014.
Van der Maaten, L. et al., "Hidden-Unit Conditional Random Fields," Journal of Machine Learning Research 15, 2011, 10 Pages.
Venkatesh, et al., "Quantum Fluctuation Theorems and Power Measurements," New J. Phys., 17, 2015, pp. 1-19.
Wang, Discovering phase transitions with unsupervised learning, Physical Review B 94, 195105 (2016), 5 pages.
Wang, W., Machta, J., & Katzgraber, H. G. "Population annealing: Theory and applications in spin glasses", 2015.
Williams, "Simple Statistical Gradient-Following Algorithms for Connectionist Reinforcement Learning," College of Computer Science, Northeastern University, Boston, MA, 1992, 27 pages.
Written Opinion of the International Searching Authority, dated Nov. 18, 2016, for International Application No. PCT/US2016/047627, 9 pages.
Patrini, et al., Making Neural Networks robust to label noise: a loss correction approach. arXiv: 1609.03683 (2016).
Achille et Soatto, "Information Dropout: Learning Optimal Representations Through Noise" Nov. 4, 2016, ICLR, arXiv:1611.01353v1, pp. 1-12. (Year: 2016).
Awasthi et al., "Efficient Learning of Linear Seperators under Bounded Noise" Mar. 12, 2015, arXiv: 1503.035S4v1, pp. 1-23. (Year 2015).
Awasthi et al., "Learning and 1-bit Compressed Sensing under Asymmetric Noise" Jun. 6, 2016, JMLR, pp. 1-41. (Year: 2016.)
Benedetti et al., "Quantum-assisted learning of graphical models with arbitrary pairwise connectivity" Sep. 8, 2016, arXiv: 1609.02542v1, pp. 1-13. (Year: 2016).
Blanchard et al., "Classification with Asymmetric Label Noise: Consistency and Maximal Denoising" Aug. 5, 2016, arXiv: 1303.1208v3, pp. 1-47. (Year: 2016).
Bornschein et al., "Bidirectional Helmholtz Machines" May 25, 2016, arXiv: 1506.03877v5. (Year: 2016).
Jain et al., "Estimating the class prior and posterior from noisy positives and unlabeled data" Jun. 28, 2016, arXiv: 1606.08561v1, pp. 1-19. (Year: 2016).
Ke et al., "Variational Convolutional Networks for Human-Centric Annotations" Nov. 20, 2016, pp. 120-135. (Year: 2016).
Korenkevych et al., "Benchmarking Quantum Hardware for Training of Fully Visible Boltzmann Machines" Nov. 14, 2016, arXiv: 1611.04528v1, pp. 1-22. (Year: 2016).
Liu et Tao, "Classification with Noisy Labels by Importance Reweighting" Mar. 2016, pp. 447-461. (Year: 2016).
Menon et al., "Learning from Binary Labels with Instance-Dependent Corruption" May 4, 2016, pp. 1-41. (Year: 2016).
Non-Final Office Action issued in U.S. Appl. No. 15/822,884 dated Feb. 17, 2022, 45 pages.
Non-Final Office Action Issued in U.S. Appl. No. 16/336,625 dated Feb. 14, 2022, 22 pages.
Omidshafiei et al., "Hierarchical Bayesian Noise Inference for Robust Real-time Probabilistic Object Classification" Jul. 14, 2016, arXiv: 1605.01042v2, pp. 1-9. (Year: 2016).
Ororbia et al., "Online Semi-Supervised Learning with Deep Hybrid Boltzmann Machines and Denoising Autoencoders" Jan. 18, 2016, ICLR, arXiv: 1511.06964v7, pp. 1-17. (Year: 2016).
Serban et al., "Multi-Modal Variational Encoder-Decoders" Dec. 1, 2016, arXiv: 1612.00377v1, pp. 1-18. (Year: 2016).
Shah et al., "Feeling the Bern: Adaptive Estimators for Bernoulli Probabilities of Pairwise Comparisons" Mar. 22, 2016, pp. 1-33. Year: 2016).
Tosh, Christopher, "Mixing Rates for the Alternating Gibbs Sampler over Restricted Boltzmann Machines and Friends" Jun. 2016. Year: 2016).
Wang et al., "Paired Restricted Boltzmann Machine for Linked Data" Oct. 2016. (Year: 2016).
Xu et Ou "Joint Stochastic Approximation Learning of Helmholtz Machines" Mar. 20, 2016, ICLR arXiv: 1603.06170v1, pp. 1-8. (Year: 2016).
Yoshihara et al., "Estimating the Trend of Economic Indicators by Deep Learning", 2019-516164, Graduate School of System Informatics, Kobe University, 28 Annual Conferences of Japanese Society for Artificial Intelligence 2014, 10 pages.
Zhang et al., "Understanding Deep Learning Requires Re-Thinking Generalization", arXiv:1611.03530 Feb. 26, 2017. https://arxiv.org/abs/1611.03530.
Zhao et al., "Towards a Deeper Understanding of Variational Autoencoding Models", arXiv:1702.08658 Feb. 28, 2017. https://arxiv.org/abs/1702.08658.
Zhu, X. et al., "Combining Active Learning and Semi-Supervised Learning Using Gaussian Fields and Harmonic Functions," ICML 2003 workshop on The Continuum from Labeled to Unlabeled Data in Machine Learning and Data Mining, 2003, 8 pages.
Zojaji et al., "A Survey of Credit Card Fraud Detection Techniques: Data and Technique Oriented Perspective", arXiv:1611.06439 Nov. 19, 2016. https://arxiv.org/abs/1611.06439.
Amin, et al., "Quatum Boltzmann Machine". arXiv:1601.02036v1, Jan. 8, 2016.
Anonymous, "A Robust Learning Approach to Domain Adaptive Object Detection". CVPR, 2019.
Azadi, et al., "Auxiliary Image Regulation for Deep CNNs with Noisy Labels". arXiv:1511.07069v2 (2016).
B. Sallans and G.E. Hitton, "Reinforcement Learning with Factored States and Actions". JMLR, 5:1063-1088, 2004.

(56) References Cited

OTHER PUBLICATIONS

Bach, et al., "Optimization with Sparsity-Inducing Penalties". arXiv:1108.0775v2, Nov. 22, 2011.
Bahnsen, et al., "Feature Engineering Strategies for Credit Card Fraud Detection", Expert systems with applications Elsevier Jun. 1, 2016. https://www.sciencedirect.com/science/article/abs/pii/S0957417415008386?via%3Dihub.
Barron-Romero, Carlos, "Classical and Quantum Algorithms for the Boolean Satisfiability Problem", CoRR, Abs/1510.02-682 )Year:2015).
Bearman, et al., "What's the Point: Semantic Segmentation with Point Supervision". ECCV, Jul. 23, 2016. https://arxiv.org/abs/1506.02106.
Bell, et al., "The "Independent Components" of Natural Scenes are Edge Filters", Vision Res. 37(23) 1997,:pp. 3327-3338.
Bellman, R. E., "Dynamic Programming". Princeton University Press, Princeton, NJ. Republished 2003: Dover, ISBN 0-486-42809-5.
Bhattacharyya, et al., "Data mining for credit card fraud: A comparitive study", Decision Support Systems 2011. https://www.semanticscholar.org/paper/Data-mining-for-credit-card-fraud%3A-A-comparative-Bhattacharyya-Jha/9d26f0ba02ee5efe9b9c7bdcb5f528c8b8253cf7.
Bian, et al., "The Ising Model: teaching an old problem new tricks", D-wave systems. 2 (year 2010), 32 pages.
Bielza, et al., "Bayesian networks in neuroscience: a survey", Oct. 16, 2014, Frontiers in Computational Neuroscience, vol. 8, Article 131, p. 1-23 (Year: 2014).
Bolton, et al., "Statistical fraud detection: A review", Statistical Science 17(3) Aug. 1, 2002. https://projecteuclid.org/journals/statistical-science/volume-17/issue-3/Statistical-Fraud-Detection-A-Review/10.1214/ss/1042727940.full.
Burda, et al., "Importance Weighted Autoencoders", arXiv:1509.00519 Nov. 7, 2016. https://arxiv.org/abs/1509.00519.
Buss, "Introduction to Inverse Kinematics with Jacobian Transpose, Pseudoinverse and Damped Least Squares methods", Mathematics UCS 2004. https://www.math.ucsd.edu/~sbuss/ResearchWeb/ikmethods/iksurvey.pdf.
Chen, et al., "Domain Adaptive Faster R-CNN for Object Detection in the Wild", IEEE Xplore, 2018, https://arxiv.org/abs/1803.03243.
Chen, et al., "Stochastic Gradient Hamiltonian Monte Carlo", arXiv:1402.4102 May 12, 2014. https://arxiv.org/abs/1402.4102.
Cho, Kyunghyun, et al., "On the Properties of Neural Machine Translation: Encoder-Decoder Approaches", arXiv:1409.1259v2, [cs.CL] Oct. 7, 2014, 9 pages.
Cho, K-H., Raiko, T, & Ilin, A., "Parallel tempering is efficient for learning restricted Boltzmann machines", 2010.
Courbariaux, M., et al., "Binarized Neural Networks: Training Neural Networks with Weights and Activations Constrained to +1 or −1". http://arxiv.org/pdf/1602.02830.pdf.
Dai, et al., "Generative Modeling of Convolutional Neural Networks". ICLR 2015.
Doersch, "Tutorial on variational autoencoders", arXiv:1606.05908 Jan. 3, 2021. https://arxiv.org/abs/1606.05908.
Fabius, Otto, et al., "Variational Recurrent Auto-Encoders", Accepted as workshop contributions at ICLR 2015, 5 pages.
Hischer, A. & Igel, C., "A bound for the convergence rate of parallel tempering for sampling restricted Boltzmann machines", 2015.
Friedman, et al., "Learning Bayesan Networks from Data", Stanford Robotics, http://robotics.stanford.edu/people/nir/tutorial/index.html.
G. Hinton, N. Srivastava, et. al, "Improving neural networks by preventing co-adaptation of feature detectors". CoRR, abs/1207.0580, 2012.
G.A. Rummery and M. Niranjan, "Online Q-Learning using Connectionist Systems". CUED/FINFENG/TR 166, Cambridge, UK, 1994.
Gal, et al., "Bayesian Convolutional Neural Networks With Bernoulli Approximate Variational Inference". arXiv:1506.02158v6, 2016.
Glynn, "Likelihood ratio gradient estimation for stochastic systems". Communications of the ACM, 1990. https://dl.acm.org/doi/10.1145/84537.84552.
Gomez-Bombarelli, et al., "Automatic chemical designs using a data-driven continuous representation of molecules", arXiv:1610.02415 Dec. 5, 2017. https://arxiv.org/abs/1610.02415.
Grathwohl, et al., "Backpropagation through the void: Optimizing control variates for biack-box gradient etimation". arXiv:1711.00123, Feb. 23, 2018. https://arxiv.org/abs/1711.00123.
Gregor, et al., "Deep autoregressive networks". arXiv:1310.8499, May 20, 2014. https://arxiv.org/abs/1310.8499.
Gregor, Karol, et al., "Draw: A Recurrent Neural Network For Image Generation", Proceedings of the 32nd International Conference on Machine Leaning, Lille, France, 2015, JMLR: W&CP vol. 37. Copyright 2015, 10 pages.
Gu, et al., "Muprop: Unbiased backpropagation for stochastic neural networks", arXiv:1511.05176, Feb. 25, 2016. https://aixiv.org/abs/1511.05176.
Hamze, "Sampling From a Set Spins With Clamping". U.S. Appl. No. 61/912,385, filed Dec. 5, 2013, 35 pages.
Hees, "Setting up a Linked Data mirror from RDF dumps". Jörn's Blog, Aug. 26, 2015. SciPy Hierarchical Clustering and Dendrogram Tutorial | Jörn's Blog (joernhees.de).
Heess, N., et al., "Actor-Critic Reinforcement Learning with Energy-based Policies". JMLR, 24:43-57, 2012.
Heidrich-Meisner, et al., "Reinforcement Learning in a Nutshell". http://image.diku.dk/igel/paper/RLiaN.pdf.
Hidasi, et al., "Session-based recommendations with recurrent neural networks", ICRL Mar. 29, 2016. https://arxiv.org/abs/1511.06939.
Hinton, Geoffrey, "A Practical Guide to Training Restricted Boltzmann Machines", Version 1, Department of Computer Science University of Toronto, Aug. 2, 2010, 21 pages.
Hinton, "A practical Guide to Training Restricted Bolzmann Machines". Department of Computer Science university of Toronto, Aug. 2, 2010.
Hinton, Geoffrey E. . Training products of experts by minimizing contrastive divergence. Neural Computation, 14:1771-1800, 2002.
Hinton, Geoffrey, Simon Osindero, and Yee-Whye Teh. A fast learning algorithm for deep belief nets. Neural computation, 18(7):1527-1554, 2006.
Jordan, Michael I., Zoubin Ghahramani, Tommi S Jaakkola, and Lawrence K Saul. An introduction to variational methods for graphical models. Machine learning, 37(2):183-233, 1999.
Le, Quoc, Marc'Aurelio Ranzato, Rajat Monga, Matthieu Devin, Greg Corrado, Kai Chen, Jeff Dean, and Andrew Ng. Building high-level features using large scale unsupervised learning. In ICML'2012, 2012.
LeCun, Y., L. Bottou, Y. Bengio, and P. Haffner. Gradient based learning applied to document recognition. Proc. IEEE, 1998.
Long, Philip M and Rocco Servedio. Restricted boltzmann machines are hard to approximately evaluate or simulate. In Proceedings of the 27th International Conference on Machine Learning (ICML-10), pp. 703-710, 2010.
Somma, RD, S Boixo, H Barnum, and E Knill. Quantum simulations of classical annealing processes. Physical review letters, 101(13):130504, 2008.
Somma, R., S Boixo, and H Barnum. Quantum simulated annealing. arXiv preprint arXiv:0712.1008, 2007.
"An implementation of the high-throughput computing system using the GPU (005)", no English translations, 2019-516164, IEICE Technical Report, vol. 114 No. 302, Nov. 13-14, 2014, 12 pages.
"Cluster Analysis", UIUC, 2013.
"Neuro-computing for Parallel and Learning Information Systems", 2019-516164, www.jstage.jst.go.jp/article/sicej/1962/27/3/27_3_255/_article/-char/ja,Nov. 14, 2021, 17 pages.
Ross, S. et al., "Learning Message-Passing Inference Machines for Structured Prediction," CVPR 2011, 2011,8 pages.
Hinton, Geoffrey E, et al., "Autoencoders, Minimum Description Length and Helmholtz Free Energy", Department of Computer Science, University of Toronto, Computation Neuroscience Laboratory, The Salk Institute, Mar. 1, 2001, 9 pages.

(56) References Cited

OTHER PUBLICATIONS

Hinton, Geoffrey E, et al., "Reducing the Dimensionality of Data with Neural Networks", Science, wwwsciencemag.org, vol. 313, Jul. 28, 2006, pp. 504-507.
Hurley, Barry, et al., "Proteus: A hierarchical Portfolio of Solvers and Transformations", arXiv:1306.5606v2 [cs. AI], Feb. 17, 2014, 17 pages.
Husmeier, "Introduction to Learning Bayesian Networks from Data", Probabilistic Modeling in Bioinformatics and Medical Informatics 2005. https://link.springer.com/chapter/10.1007/1-84628-119-9_2.
Jang, et al., "Categorical reparameterization with Gumbel-Softmax", arXiv:1611.01144 Aug. 5, 2017. https://arxiv.org/abs/1611.01144.
Jiang, et al., "Learning a discriminative dictionary for sparse coding via label consistent K-SVD", In CVPR 2011 (pp. 1697-1704) IEEE. Jun. 2011).
Khalek, Shadi A, et al., "Automated SQL Query Generation for Systematic Testing of Database Engines", In proceedings of the IEEE/ACM International Conference of Automated Software Engineering pp. 329-332. Association of Computing Machinery. (Year: 2008).
Kingma, et al., "Adam: A method for stochastic optimization", arXiv:1412.6980 Jan. 30, 2017. https://arxiv.org/abs/1412.6980.
Kingma, et al., "Auto-encoding variational bayes". arXiv:1312.5258v1, May 1, 2014. https://arxiv.org/abs/1312.6114.
Kingma, Diederik P, et al., "Semi-Supervised Learning with Deep Generative Models", arXiv:1406.5298v2 [cs.LG], Oct. 31, 2014, 9 pages.
Korenkevych, et al., "Benchmarking quantum hardware for training of fully visible boltzmann machines", arXiv:1611.04528 Nov. 14, 2016. https://arxiv.org/abs/1611.04528.
Krause, et al., "The Unreasonable Effectiveness of Noisy Data for Fine-Grained Recognition", 2016, Springer International Publishing AG, ECCV 2016, Part III, LNCS 9907, pp. 301-320 (Year:2016).
Kuzelka, Ondrej, et al., "Fast Estimation of First-Order Clause Coverage through Randomization and Maximum Likelihood", In proceeding of the 25th International Conference on Machine Learning (pp. 504-5112). Association for Computing Machinery (Year:2008).
L.Wan, M. Zieler, et. al., "Regularization of Neural Networks using DropConnect". ICML, 2013.
Le Roux, Nicolas, et al., "Representational Power of Restricted Boltzmann Machines and Deep Belief Networks", Dept. IRO, University of Montréal Canada, Technical Report 1294, Apr. 18, 2007, 14 pages.
Lee, et al., "Efficient sparse coding algorithm", NIPS, 2007,pp. 801-808.
Lee, H., et al., "Sparse deep belief net model for visual area v2". Advances in Neural Information Processing Systems, 20. MIT Press, 2008.
Li, et al., "R/'enyi Divergence Variational Inference", arXiv:1602.02311 Oct. 28, 2016. https://arxiv.org/abs/1602.02311.
Lin, et al., "Efficient Piecewise Training of Deep Structured Models for Semantic Segmentation". arXiv:1504.01013v4, 2016.
Lovasz, et al., "A Correction: orthogonal representations and connectivity of graphs", Linear Algebra and it's Applications 313:2000 pp. 101-105.
Lovasz, et al., "Orthogonal Representations and Connectivity of Graphs", Linear Algebra and its applications 114/115; 1989, pp. 439-454.
Macready, et al., "Applications of Hardware Boltzmann Fits". U.S. Appl. No. 61/515,742, filed Aug. 5, 2011, 11 pages.
Macready, et al., "Applications of Hardware Boltzmann Fits". U.S. Appl. No. 61/540,208, filed Sep. 28, 2011, 12 pages.
Macready, et al., "Applications of Hardware Boltzmann Fits". U.S. Appl. No. 61/505,044, filed Jul. 6, 2011.
Macready, et al., "Systems and Methods for Minimizing an Objective Function". U.S. Appl. No. 61/550,275, filed Oct. 21, 2011, 26 pages.
Macready, et al., "Systems and Methods for Minimizing an Objective Function". U.S. Appl. No. 61/557,783, filed Nov. 9, 2011, 45 pages.
Maddison, et al., "The concrete distribution: A continuous relaxation of discrete random variables", arXiv:1611.00712 Mar. 5, 2017. https://arxiv.org/abs/1611.00712.
Makhzani, Alireza, et al., "Adversarial Autoencoders", arXiv:1511.05644v2 [cs.LG], May 25, 2016, 16 pages.
Mandt, et al., "A Variational Analysis of Stochastic Gradient Algorithms", arXiv:1602.02666 Feb. 8, 2016. https://arxiv.org/abs/1602.02666.
Misra, et al., "Seeing through the Human Reporting Bias: Visual Classifiers from Noisy Human-Centric Labels", 2016 IEEE Conference on Computer Vision and Pattern Recognition, IEEE, 2016, pp. 2930-2939.
Misra, et al., "Visual classifiers from noisy humancentric labels", in The IEEE Conference on Computer Vision and Pattern Recognition (CVPR), 2016.
Mnih, et al., "Neural variational inference and learning in belief networks". arXiv:1402.0030 Jun. 4, 2016, https://arxiv.org/abs/1402.0030.
Mnih, et al., "Variational inference for Monte Carlo objectives". arXiv:1602.06725, Jun. 1, 2016. https://arxiv.org/abs/1602.06725.
Mnih, Andriy, et al., "Variational Inference for Mote Carlo Objectives", Proceedings of the 33rd International Conference on Machine Learning, New York, NY USA, 2016, JMLR: W&CP vol. 48, 9 pages.
Murphy, "A Brief Introduction to Graphical Models and Bayesian Networks", Oct. 14, 2001. https://www.cs.ubc.ca/~murphyk/Bayes/bayes_tutorial.pdf.
Murphy, "Machine Learning: a probaiistic perspective", MIT Press, 2012. http://noiselab.ucsd.edu/ECE228/Murphy_Machine_Learning.pdf.
Muthukrishnan, et al., "Classical and quantum logic gates: an introduction to quantum computing", Quantum information seminar, )Year: 1999) 22 pages.
N. Srivastava, G. Hinton, et. al, "Dropout: A Simple Way to Prevent Neural Networks from Overtting". ICML 15 (Jun):19291958, 2014.
Neal, et al., "Memo Using Hamiltonian Dynamics", Handbook of Markov Chairs Monte Carlo 2011.
Neven, et al., "Training a binary classifier with the quantum adiabatic algorithm", arXiv preprint arXivc:0811.0416, 2008, 11 pages.
Olshausen, Bruno A, et al., "Emergence of simple cell receptive field properties by learning a sparse code for natural images", Nature, vol. 381, Jun. 13, 1996, pp. 607-609.
Phua, et al., "A comprehensive survey", arXiv:1009.6119 Aug. 30, 2010. https://arxiv.0rg/abs/1009.6119.
Pozzolo, et al., "Learned Lessons in credit card fraud detection from a practitioner perspective", Feb. 18, 2014. https://www.semanticscholar.org/paper/Learned-lessons-in-credit-card-fraud-detection-from-Pozzolo-Caelen/6d2e2a1caf5b3757ed0e8f404eabb31546d5698a.
Rasmus, Antti, et al., "Semi-Supervised Learning with Ladder Networks", arXiv:1507.02672v2 [cs.NE] Nov. 24, 2015, 19 pages.
Raymond, et al., "Systems and Methods for Comparing Entropy and KL Divergence of Post-Processed Samplers," U.S. Appl. No. 62/322,116, filed Apr. 13, 2016, 47 pages.
Rezende, et al., "Stochastic Backpropagation and Approximate Inference in Deep Generative Models," arXiv:1401.4082v3 [stat.ML] May 30, 2014, 14 pages, https://arxiv.org/abs/1401.4082.
Rezende, Danilo J, et al., "Variational Inference with Normalizing Flows", Proceedings of the 32nd International Conference on Machine Learning, Lille, France 2015, JMLR: W&CP vol. 37, 9 pages.
Rolfe, "Discrete variational autoencoders" arXiv:1609.02200 Apr. 22, 2017. https://arxiv.org/abs/1609.02200.
Rose, et al., "Systems and Methods for Quantum Processing of Data, for Example Functional Magnetic Resonance Image Data". U.S. Appl. No. 61/841,129, filed Jun. 28, 2013, 129 pages.
Rose, et al., "Systems and Methods for Quantum Processing of Data, for Example Imaging Data". U.S. Appl. No. 61/873,303, filed Sep. 3, 2013, 38 pages.

(56) References Cited

OTHER PUBLICATIONS

Rose, et al., "Training DBMs with Physical Neural Nets," Hack The Multiverse, Jan. 24, 2014, pp. 2-5. Retrieved from the Internet: URL: https://dwave.wordpress.com/2014/01/24/trainingdbmswith-physical-neural-nets, see pp. 2-5.

Salakhutdinov, R., "Learning deep Boltzmann machines using adaptive MCMC", 2010.

Salakhutdinov, R., "Learning in Markov random transitions.elds using tempered", 2009.

Salakhutdinov, R. & Murray, I., "On the quantitative analysis of deep belief networks", 2008.

Saliman, Tim, "A Structured Variational Auto-encoder for Learning Deep Hierarchies of Sparse Features", arXiv:1602.08734v1 [stat.ML] Feb. 28, 2016, 3 pages.

Salimans, Tim, et al., "Markov Chain Monte Carlo and Variational Inference: Bridging the Gap", arXiv:1410.6460v4 [stat.CO] May 19, 2015, 9 pages.

Schulman, et al., "Gradient estimation using stochastic computing graphs". arXiv:1506.05254, Jan. 5, 2016. https://arxiv.org/abs/1506.05254.

Schwartz-Ziv, et al., "Opening the black box of Deep Neural Networks via Information", arXiv:1703.00810 Apr. 29, 2017. https://arxiv.org/abs/1703.00810.

Sethi, et al., "A revived survey of various credit card fraud detecion techniques", International Journal of Computer Science and Mobile Computing Apr. 14, 2014. https://tarjomefa.com/wp-content/uploads/2018/08/TarjomeFa-F994-English.pdf.

Shahriari, et al., "Taking the human out of the loop: A review of bayesian optimization", Proceedings of the IEEE 104 Jan. 1, 2016.

Silver, et al., "Mastering the game of Go with deep neural networks and tree search". Nature, 529, 484489, 2016.

Smelyanskiy, et al., "A near-term quantum computing approach for hard computational problems in space exploration" arXiv preprint arXir:1204.2821 (year:2012).

Sonderby, et al., "Ladder Variational Autoencoders", arXiv:1602.02282v3 [stat.ML] May 27, 2016, 12 pages.

Sprechmann, et al., "Dictionary learning and sparse coding for unsupervised clustering", in 2010 IEEE international conference on acoustics, speech and signal processing (pp. 2042-2045) IEEE (year:2010).

Sutton, "Learning to Predict by the Methods of Temporal Differences". https://webdocs.cs.ualberta.ca/ sutton/papers/sutton-88-with-erratum.pdf.

Sutton, R., et al., "Policy gradient methods for reinforcement learning with function approximation". Advances in Neural Information Processing Sytems, 12, pp. 1057-1063, MIT Press, 2000.

Suzuki, et al., "Joint Multimodal Learning With Deep Generative Models", Nov. 7, 2016, arXiv:1611.0189v1 (Year: 2016).

Szegedy, et al., "Rethinking the Inception Architecture for Computer Vision", 2016, Proceedings of the IEEE Conference on Computer Vision and Pattern Recognition (CVPR), pp. 2818-2826 (Year: 2016).

Tieleman, T. & Hinton, G., "Using fast weights to improve persistent contrastive divergence", 2009.

Tokui, et al., "Evaluating the variance of likelihood-ratio gradient estimators", Proceedings of the 34th International Conference on Machine Learning, 2017. http://proceedings.mlr.press/v70/tokui17a.html.

Tripathi, et al., "Survey on credit card fraud detection methods", Internation Journal of Emerging Technology and Advanced Engineering Nov. 12, 2012.

Tucker, et al., "Rebar: Low-variance, unbiased gradient estimates for discrete latent variable models". arXiv:1703.07370, Nov. 6, 2017. https://arxiv.org/abs/1703.07370.

Vahdat, "Machine Learning Systems and Methods for Training With Noisy Labels," U.S. Appl. No. 62/427,020, filed Nov. 28, 2016, 30 pages.

Vahdat, "Machine Learning Systems and Methods for Training With Noisy Labels," U.S. Appl. No. 62/508,343, filed May 18, 2017, 46 pages.

Vahdat, "Toward Robustness against Label Noise in Training Deep Discriminative Neural Networks". arXiv:1706.00038v2, Nov. 3, 2017. https://arxiv.org/abs/1706.00038.

Vahdat, et al., "Dvae++: Discrete variational autoencoders with overlapping transformations", arXiv:1802.04920 May 25, 2018. https://arxiv.org/abs/1802.04920.

Van Det Maaten, et al., "Hidden unit conditional random Fields". 14th International Conference on Artificial Intelligence and Statistics, 2011.

Veit, et al., "Learning From Noisy Large-Scale Datasets With Minimal Supervision". arXiv:1701.01619v2, Apr. 10, 2017. https://arxiv.org/abs/1701.01619.

Wan, L., et al., "Regularization of Neural Networks using DropConnec". ICML 2013.

Wang, et al., "Classification of common human diseases derived from shared genetic and environmental determinants", Nature Genetics Aug. 7, 2017. https://www.nature.com/articles/ng.3931.

Welling, et al., "Bayesian learning via stochastic gradient langevin dynamics", ICML Jun. 28, 2011. https://dl.acm.org/doi/10.5555/3104482.3104568.

Wiebe, Nathan, et al., "Quantum Inspired Training for Boltzmann Machines", arXiv:1507.02642v1 [cs.LG] Jul. 9, 2015, 18 pages.

Williams, "Simple Statistical Gradient-Following Algorithms for Connectionist Reinforcement Learning," Springer, College of Computer Science, Northeastern University, Boston, MA, 1992, 27 pages, https://link.springer.com/article/10.1007/BF00992696.

Wittek, Peter, "What Can We Expect from Quantum Machine Learning". Yandex 1-32 School of Data Analysis Conference Machine Learning: Prospects and Applications, Oct. 5, 2015. pp. 1-16.

Xiao, et al., "Learning from massive noisy labeled data for image classification". The IEEE Conference on Computer Vision and Pattern Recognition (CVPR) 2015.

Xie, et al., "A Theory of Generative ConvNet". ICML 2016.

Xing, "Bayesian and Markov Networks: A unified view", Carnegie Mellon: School of Computer Science Sep. 19, 2007. http://www.cs.cmu.edu/~epxing/Class/10708-07/Slides/lecture3-BN&MRF.pdf.

Zhang, Yichuan, et al., "Continuous Relaxations for Discrete Hamiltonian Monte Carlo", School of Informatic, University of Edinburgh, Dept of Engineering, University of Cambridge, United Kingdom, 9 pages.

Zheng, et al., "Graph regularized sparse coding for image representation", IEEE transaction on image processing, 20(5), (Year: 2010) 1327-1336.

* cited by examiner

SIMULATING AND POST-PROCESSING USING A GENERATIVE ADVERSARIAL NETWORK

FIELD

This disclosure generally relates to systems, devices, and methods for simulating and post-processing samples generated by a hybrid computing system comprising a quantum computer and a digital computer. Simulating and post-processing samples can include using machine learning techniques such as generative adversarial networks.

BACKGROUND

Quantum Processor

A quantum processor is a computing device that can harness quantum physical phenomena (such as superposition, entanglement, and quantum tunneling) unavailable to non-quantum devices. A quantum processor may take the form of a superconducting quantum processor. A superconducting quantum processor may include a number of qubits and associated local bias devices, for instance two or more superconducting qubits. An example of a qubit is a flux qubit. A superconducting quantum processor may also employ coupling devices (i.e., "couplers") providing communicative coupling between qubits. Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

In one implementation, a quantum processor may include a topology that comprises a set of qubits and a set of couplers. Pairs of qubits can be communicatively coupled to one another via a respective coupler. Programmable elements such as digital-to-analog converters can be used to apply a bias to a qubit.

A computational system comprising a quantum processor designed as such can find minimum-cost solution to an Ising minimization problem. Given a collection of biases and couplings, values from $\{-1, +1\}$ are assigned to spin variable s so as to minimize the energy function expressed as:

$$E(s) = \sum_i h_i s_i + \sum_{i,j} J_{i,j} s_i s_j$$

where $h_i$ are local biases and $J_{i,j}$ are coupling strengths. The spin variables can be interpreted as magnetic poles in a physical particle system and the optimal solution can be called a ground state.

In operating a quantum processor, a flux signal may be applied to a respective qubit loop to realize the bias term $h_i$ of the Ising model. These flux signals also provide the spin variable terms s in the Ising model. A flux signal may be applied to a coupler that communicatively couples a pair of qubits to realize the $J_{i,j}$ term(s) in the Ising model.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is a linear interpolation between initial Hamiltonian and final Hamiltonian. An example is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. If the rate of evolution is slow enough that the system is always in the instantaneous ground state of the evolution Hamiltonian, then transitions at anti-crossings (i.e., when the gap size is smallest) are avoided. Other evolution schedules are possible including non-linear, parametric, and the like. Initial values for biases and coupling strengths may be loaded onto a quantum processor and a quantum annealing algorithm may be executed for a certain anneal time. Qubit states can be read to obtain a solution, and the quantum processor may be annealed multiple times to obtain a sample of multiple solutions. Further details on adiabatic quantum computing systems, methods, and apparatus are described in, for example, U.S. Pat. Nos. 7,135,701; and 7,418,283.

Machine Learning

Machine learning relates to systems and methods that can learn from data and make predictions based on data. In contrast to systems and methods that follow static program instructions, machine learning can include deriving a model from example inputs (such as a training set) and then making data-driven predictions.

A machine learning model can include methods for training a multilayer perceptron or neural network. A typical approach to designing part of a machine learning model can include applying an activation function to a weighted sum of input variables to determine an output. For the multilayer perceptron to learn, the activation function can be updated by adjusting a set of weights. To determine the magnitude and direction of the adjustment for each weight, a gradient can be calculated that captures the error of the output measured against a target distribution. The gradient can be used to back-propagate the error through each layer of the multilayer perceptron to adjust the set of weights.

Generative learning and discriminative learning are two categories of approaches to machine learning. Generative approaches are based on models for a joint probability distribution over the observed and the target variables, whereas discriminative approaches are based on models for a conditional probability of the target variables given the observed variables. Examples of generators include Restricted Boltzmann Machines, Gaussian mixture models, and probabilistic context-free grammars. Some examples of generative learning models are described in PCT Publication No. WO02017132545A1.

Sampling

In statistics, a sample is a subset of a population, such as a plurality of data points collected from a statistical population. A hybrid computer can draw samples from an analog computer acting as a sample generator. The analog computer can be operated to provide samples from a probability distribution, where the probability distribution assigns a respective probability of being sampled to each data point in the population.

An analog processor, such as a quantum processor, and in particular a quantum processor designed to perform quantum annealing and/or adiabatic quantum computation, may be operated as a sample generator, where the population can be possible states of the processor, and each sample can correspond to a state of the processor. Using an analog processor as a sample generator may be a preferred mode of operating the processor for certain applications. Operating an analog processor as a sample generator may also enable a broader range of problems to be solved compared to, for example, using an analog processor to find a low energy state of a Hamiltonian that encodes an optimization problem.

Sampling from a quantum Hamiltonian can be challenging. The statistical nature of quantum processor, such as one implemented in an adiabatic quantum computer, can be exploited for sampling purposes. Typically, it is a challenge for an adiabatic quantum computer to be able to equilibrate quickly enough at points during the annealing process to provide equilibrium samples efficiently. Generating samples from a quantum processor can be computationally expensive, therefore it is desirable to combine the use of a quantum processor performing quantum annealing with the use of a classical or digital processor performing classical methods.

One way to combine the use of a quantum processor and a classical or digital processor is to use post-processing techniques, such as described in PCT Patent Publication No. WO2016/029172A1. However, the amount of post-processing needed to achieve a desired accuracy can become large enough that it at least partially negates the benefit of obtaining initial samples from the quantum processor.

There is thus a general desire for systems and methods to use classical methods, such as machine learning methods, to post-process samples generated by a quantum processor for use in optimization or sampling applications.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

There exists a need to improve sampling techniques that include using samples generated by a quantum processor because sampling from a quantum processor can be slow. An approach for improving sampling techniques from a quantum processor includes applying machine learning methods, such as generative adversarial networks, to simulate and/or post-process samples generated by the quantum processor.

A method of computationally efficiently producing sample sets in a processor-based system, may be summarized as including: initializing a generator parameter $\theta$; initializing a discriminator parameter $\phi$; drawing a noise sample $z_k$ from a noise prior distribution $r(z)$; for each respective noise sample $z_k$ drawn from the noise prior distribution $r(z)$, drawing a generated sample $x^{(m|k)}$ from a generator $g_\theta(x|z)$; drawing a target sample $\hat{x}^{(k)}$ from a target distribution $\mathbb{E}_{h,J}$ that was generated by a quantum processor for a set of biases h and a set of coupling strengths J, where k=1, ..., K; adjusting the generator parameter $\theta$; adjusting the discriminator parameter $\phi$; and determining whether the adjusted generator parameter $\theta$ and the adjusted discriminator parameter $\phi$ each meet respective optimization criteria.

The method may further include: receiving the set of biases and the set of coupling strength values before drawing the noise sample $z_k$ from the noise prior distribution $r(z)$.

The method may further include: in response to a determination that at least one of the adjusted generator parameter $\theta$ or the adjusted discriminator parameter $\phi$ do not meet the respective optimization criteria, drawing a new noise sample $z_k$ from the noise prior distribution $r(z)$.

The method may further include: in a first iteration, receiving a set of biases and a set of coupling strength values before drawing the noise sample from the noise prior distribution $r(z)$; in response to a determination that at least one of the adjusted generator parameter $\theta$ or the adjusted discriminator parameter $\phi$ do not meet the respective optimization criteria, in a second iteration: receiving a new set of biases and a new set of coupling strength values before drawing a new noise sample in the second iteration; and drawing the new noise sample $z_k$ from the noise prior distribution $r(z)$ in the second iteration.

Drawing a noise sample $z_k$ from a noise prior distribution $r(z)$ may include drawing a noise sample $z_k$ from a uniform distribution or a Gaussian distribution. Drawing a noise sample $z_k$ from a noise prior distribution $r(z)$ may include drawing a noise sample $z_k$ from a multi-dimensional distribution. Drawing a noise sample $z_k$ from a noise prior distribution $r(z)$ may include drawing a noise sample $z_k$ from a noise prior distribution $r(z)$ that includes K noise samples $z_k$, where k=1, ..., K.

The method may further include generating a generated sample x for each noise sample $z_k$ drawn from noise prior distribution $r(z)$ via a generator function $g_\theta(x|z)$, wherein the generator function $g_\theta(x|z)$ determines a pointwise probability $q_\theta(x)$ of a generative distribution $\mathbb{Q}_\theta$ defined by:

$$q_\theta(x) = \int_z g_\theta(x|z) \cdot r(z) dz$$

The method may further include generating M generated samples $x^{(m|k)}$ via the generative distribution $\mathbb{Q}_\theta$, each generated sample $x^{(m|k)}$ being a respective vector of qubit states defined on $\{-1,1\}^n$, where m=1, ..., M.

Determining whether the adjusted generator parameter and the adjusted discriminator parameter are optimized may include determining if a divergence between the generative distribution and the target distribution is minimized. Determining whether the adjusted generator parameter and the adjusted discriminator parameter are optimized may include determining if the generator parameter $\theta$ is minimized and the discriminator parameter $\phi$ is maximized. Determining whether the adjusted generator parameter and the adjusted discriminator parameter are optimized may include determining if the generator and the discriminator have converged. Determining whether the adjusted generator parameter and the adjusted discriminator parameter are optimized may include determining if a change in a step size of the generator parameter $\theta$ is negligible. Determining whether the adjusted generator parameter and the adjusted discriminator parameter are optimized may include determining if a change in a step size of the discriminator parameter $\phi$ is negligible. Determining if a change in a step size of the discriminator parameter $\phi$ is negligible may include determining if discriminator parameter does not change appreciably compared a previous iteration.

The method may further include: conditioning at least one of the generator or the discriminator on multiple sets of biases and multiple sets of coupling strengths.

The method may further include: employing a different set of biases and a different set of coupling strengths during each of a plurality of iterations.

The method may further include: generating samples by a quantum processor for a set of biases and a set of coupling strengths.

A processor-based system to computationally efficiently producing sample sets, may be summarized as including: at least one processor; at least one nontransitory processor-readable medium communicatively coupled to the at least one processor and which stores processor executable instructions which, when executed by the at least one processor, cause the at least one processor to: initialize a generator parameter $\theta$; initialize a discriminator parameter $\phi$; draw a noise sample $z_k$ from a noise prior distribution $r(z)$;

for each respective noise sample $z_k$ drawn from the noise prior distribution r(z), draw a generated sample $x^{(m|k)}$ from a generator $g_\theta(x|z)$; draw a target sample $\hat{x}^{(k)}$ from a target distribution $\mathbb{E}_{h,J}$ that was generated by a quantum processor for a set of biases h and a set of coupling strengths J, where k=1, . . . , K; adjust the generator parameter θ; adjust the discriminator parameter ϕ; and determine whether the adjusted generator parameter θ and the adjusted discriminator parameter ϕ each meet respective optimization criteria.

When executed, the processor executable instructions cause the processor further to: receive the set of biases and the set of coupling strength values before drawing the noise sample $z_k$ from the noise prior distribution r(z).

When executed, the processor executable instructions cause the processor further to: in response to a determination that at least one of the adjusted generator parameter θ or the adjusted discriminator parameter ϕ do not meet the respective optimization criteria, draw a new noise sample $z_k$ from the noise prior distribution r(z).

When executed, the processor executable instructions cause the processor further to: in a first iteration, receive a set of biases and a set of coupling strength values before drawing the noise sample from the noise prior distribution r(z); in response to a determination that at least one of the adjusted generator parameter θ or the adjusted discriminator parameter ϕ do not meet the respective optimization criteria, in a second iteration: receive a new set of biases and a new set of coupling strength values before drawing a new noise sample in the second iteration; and draw the new noise sample $z_k$ from the noise prior distribution r(z) in the second iteration.

The at least one processor may draw a noise sample $z_k$ from a uniform distribution or a Gaussian distribution. The at least one processor may draw a noise sample $z_k$ from a multi-dimensional distribution. The at least one processor nay draw a noise sample $z_k$ from a noise prior distribution r(z) that includes K noise samples $z_k$, where k=1, . . . , K.

A pointwise probability $q_\theta(x)$ of a generative distribution $\mathbb{Q}_{74}$ is defined by:

$$q_\theta(x) = \int_z g_\theta(x|z) \cdot r(z) dz$$

where $g_\theta(x|z)$ is a generator function, and wherein, when executed, the processor executable instructions may cause the processor further to: generate a generated sample x for each noise sample $z_k$ drawn from noise prior distribution r(z) via the generator function $g_\theta(x|z)$.

The processor executable instructions may cause the processor further to: generate M generated samples $x^{(m|k)}$ via the generative distribution $\mathbb{Q}_\theta$ can, each generated sample $x^{(m|k)}$ being a respective vector of qubit states defined on $\{-1,1\}^n$, where m=1, . . . , M.

To determine whether the adjusted generator parameter and the adjusted discriminator parameter are optimized the at least one processor may determine if a divergence between the generative distribution and the target distribution is minimized. To determine whether the adjusted generator parameter and the adjusted discriminator parameter are optimized the at least one processor may determine if the generator parameter θ is minimized and the discriminator parameter ϕ is maximized. To determine whether the adjusted generator parameter and the adjusted discriminator parameter are optimized the at least one processor may determine if the generator and the discriminator have converged. To determine whether the adjusted generator parameter and the adjusted discriminator parameter are optimized the at least one processor may determine if a change in a step size of the generator parameter θ is negligible. To determine whether the adjusted generator parameter and the adjusted discriminator parameter are optimized the at least one processor may determine if a change in a step size of the discriminator parameter ϕ is negligible. To determine if a change in a step size of the discriminator parameter ϕ is negligible the at least one processor may determine if discriminator parameter does not change appreciably compared a previous iteration.

When executed, the processor executable instructions may cause the processor further to: condition at least one of the generator or the discriminator on additional information, such as multiple sets of biases and multiple sets of coupling strengths.

When executed, the processor executable instructions may cause the processor further to: employ a different set of biases and a different set of coupling strengths during each of a plurality of iterations.

The at least one processor may include at least one digital processor, the at least one digital processor which performs all of the aforesaid acts.

The at least one processor may include at least one quantum processor, the at least one quantum processor which generates samples for a set of biases and a set of coupling strengths.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
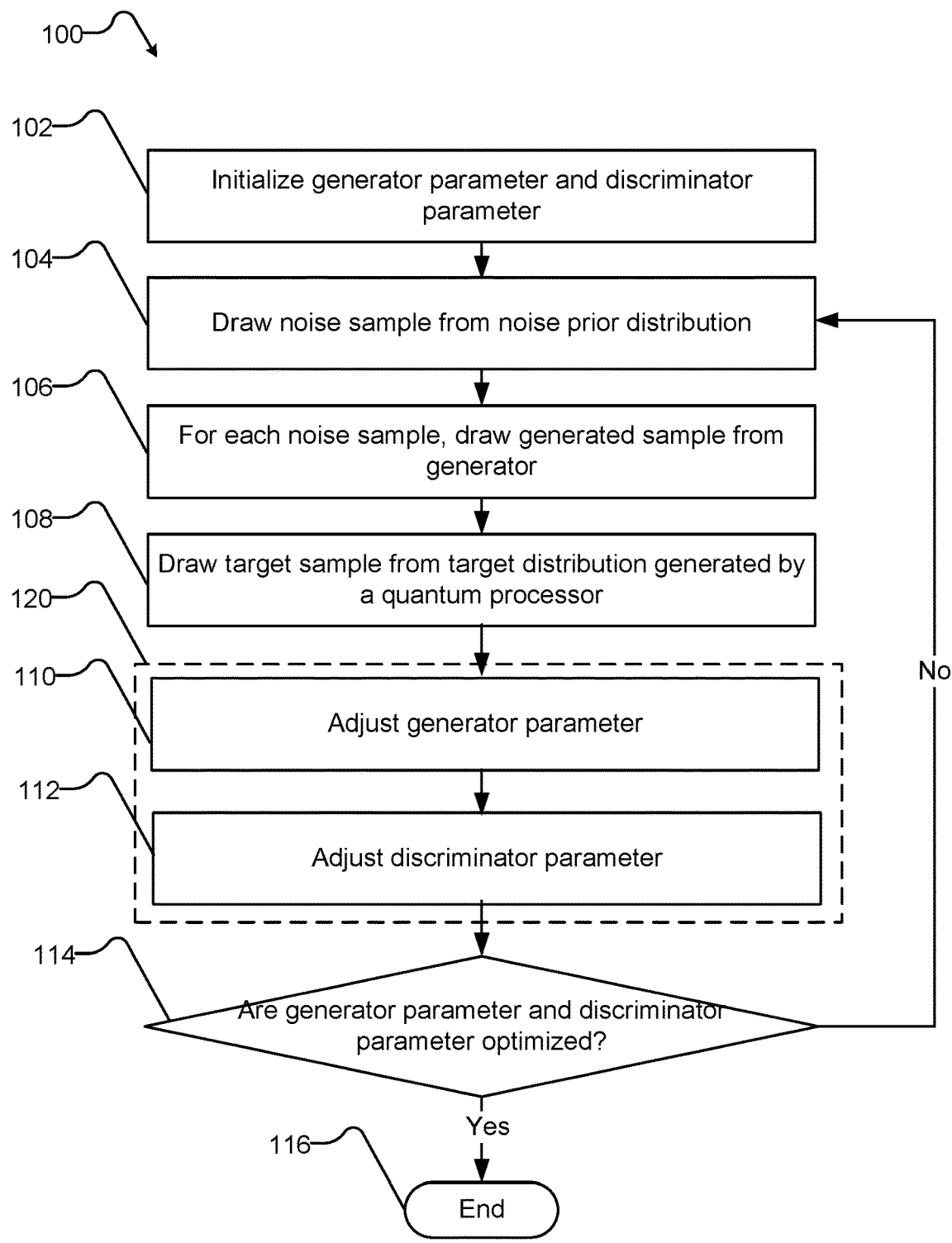
FIG. 1 is a flowchart illustrating a method for training an example GAN using samples generated by a quantum processor for a set of biases and a set of coupling strengths, according to the present systems and methods.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Samples can be drawn from a quantum processor for a set of biases h and a set of coupling strengths J that correlate to an energy function that defines an Ising model. However, generating samples from the quantum processor can be challenging and slow. The present systems and methods describe combining a quantum processor with machine learning methods to post-process and reproduce samples generated from the quantum processor.

Reproduced samples that are similar or identical to original samples that are drawn from a quantum processor can be desirable because the reproduced samples can replace original samples or can be added to original samples drawn. Samples that includes the reproduced samples can be used in sampling or finding minimum-cost solutions to optimization problems.

Generative Adversarial Networks (GANs)

GANs can be useful for approximate model estimations. A GAN can include a generator and a discriminator, both of which can be multilayer perceptrons. In a typical GAN, the generator generates samples from a noise prior distribution that is defined on input noise variables, and the discriminator is trained to determine the probability of whether a sample is from the generator or from a target distribution. The discriminator can be considered an auxiliary neural network that is used to train the generator.

When training a GAN, a common approach used to determine the distance between two probability distributions (e.g., a generative distribution and a target distribution) is the Jensen-Shannon (JS) divergence. The JS divergence is part of a family of statistical divergences called f-divergences. Nowozin et al.'s paper titled "f-GAN: Training Generative Neural Samplers using Variational Divergence Minimization" (2016) suggests that training a GAN is not limited to using the JS divergence or other types of f-divergences. Nowozin et al shows that other divergences lead to more general variational divergence estimation approaches can be used to train a GAN.

In the case of using f-divergences, the f-divergence $D_f$ between a target distribution $\mathbb{P}$ and a generative distribution $\mathbb{Q}$ in terms of pointwise probabilities (or densities) $p(x)$, $q(x)$, respectively, is defined by:

$$D_f(\mathbb{P}, \mathbb{Q}) = \int q(x) f\left(\frac{p(x)}{q(x)}\right) dx$$

A lower bound of f-divergence $D_f$ can be formulated as a variational divergence minimization problem expressed as:

$$D_f(\mathbb{E}, \mathbb{Q}) \geq \sup \mathbb{E}_\mathbb{P}[T_{99}(x)] - \mathbb{E}_\mathbb{Q}[f^*(T_\phi(x))]$$

where $T_\phi(x)$ is a is a discriminator that can comprise a multilayer perceptron parameterized by a discriminator parameter $\phi$, $f^*$ is a Fenchel dual (i.e., a convex conjugate) of a convex lower semi-continuous function $f$, and generative distribution $\mathbb{Q}$ can comprise a multilayer perceptron parameterized by a generator parameter $\theta$.

By incorporating a GAN using the f-divergence, the generative model of the GAN can be estimated using variational divergence minimization. The GAN can be trained with the objective of maximizing the discriminator parameter $\phi$ and minimizing the generator parameter $\theta$ of a variational lower bound function $V(\mathbb{E}, \mathbb{T}_\theta, \mathbb{Q}_\phi)$ expressed as:

$$\min_\theta \max_\phi v(\mathbb{P}, \mathbb{Q}_\theta, \mathbb{T}_\phi) = \mathbb{E}_\mathbb{P}[T_\phi(x)] - \mathbb{E}_{\mathbb{Q}_\theta}[f^*(T_\phi(x))]$$

In some cases, training a GAN by minimizing the generator parameter $\theta$ and maximizing the discriminator parameter $\phi$ can include, in separate acts, adjusting the generator parameter $\theta$, approximating the distance between a generative distribution and a target distribution by adjusting the discriminator parameter $\phi$, and then repeating the aforementioned acts. In other cases, training a GAN can include simultaneously adjusting the generator parameter $\theta$ and measuring the distance between a generative distribution and a target distribution by adjusting the discriminator parameter $\phi$.

One approach for adjusting the generator parameter $\theta$ and the discriminator parameter $\phi$ is to use gradient optimization for back-propagation. Calculating a gradient to train the GAN requires differentiation so continuous distributions are typically used to train the generator and the discriminator of a GAN.

It can be challenging to train a GAN that generates a discrete distribution because derivatives of step functions are zero. This is impractical for adjusting parameters using gradient optimization. Hjelm et al. describes a method for training a generator with a discrete distribution as the target distribution "Boundary-Seeking Generative Adversarial Networks" (2018).

Using Quantum Processor Samples as a Target Distribution for Training a GAN

An example of a target distribution that can be used for training a GAN is a sample distribution generated by a quantum processor. The quantum processor can comprise a number of qubits n that each have a bias applied to realize the h term of an Ising model and a pair of qubits is coupled with a coupling strength J. The quantum processor can produce samples according to methods described in U.S. Pat. No. 9,218,567, for example.

FIG. 1 is a flowchart illustrating a method 100 for training an example GAN using samples generated by a quantum processor for a set of biases and a set of coupling strengths, according to the present systems and methods. The GAN includes a generator and a discriminator. Method 100 includes acts 102-120, though in other implementations, certain acts can be omitted and/or additional acts can be added. Method 100 can be performed by, for example, a hybrid computing system including a digital computer and a quantum processor in response to instructions or a program submitted by a user.

At 102, a generator parameter θ and a discriminator parameter φ are each initialized. For example, the generator parameter θ and the discriminator parameter φ can each be initialized with a value selected by a user.

At 104, a noise sample $z_k$ is drawn from a noise prior distribution r(z). The noise prior distribution can be a fixed distribution. For example, the noise prior distribution can be a uniform distribution or a Gaussian distribution (i.e., z∈ [0, 1] or z∈ (0,1)). In some implementations, the noise prior distribution can be any multi-dimensional distribution. The noise prior distribution r(z) can include K noise samples $z_k$, where k=1, . . . , K. The pointwise probability $q_\theta(x)$ of the generative distribution $\mathbb{Q}_\theta$ is defined by:

$$q_\theta(x) = \int_z g_\theta(x|z) \cdot r(z) dz$$

where $g_\theta(x|z)$ is a generator (i.e., a probability mass function) that is used to generate a generated sample x for each noise sample $z_k$ drawn from noise prior distribution r(z). Generated samples x collectively constitute the generative distribution $\mathbb{Q}_\theta$. The generator $g_\theta(x|z)$ can generate generated samples x that belong to a different data space or set than noise samples z of the noise prior distribution r(z). In one implementation, the generated sample x is a vector of qubit states defined on $\{-1,1\}^n$ where n is the number of qubits. In one implementation, generator $g_\theta(x|z)$ may draw noise samples z from a noise prior distribution defined on [0,1] to generate generated samples x that are defined on $\{-1,1\}^n$. The pointwise probability $q_\theta(x)$ may be the probability of n qubits being in a set of states described in elements of the vector of qubit states (i.e., generated sample x).

At 106, for each respective noise sample $z_k$ drawn from the noise prior distribution r(z), a generated sample $x^{(m|k)}$ is drawn from the generator $g_\theta(x|z)$. Each generated sample $x^{(m|k)}$ can be a vector of qubit states defined on $\{-1,1\}^n$, where m=1, . . . , M. The generative distribution $\mathbb{Q}_\theta$ can generate M generated samples $x^{(m|k)}$.

At 108, a target sample $\hat{x}^{(k)}$ is drawn from a target distribution $\mathbb{E}_{h,J}$ generated by the quantum processor for a set of biases h and a set of coupling strengths J, where k=1, . . . , K.

At 120, the generator parameter θ and the discriminator parameter φ are adjusted. The generator parameter θ and the discriminator parameter φ can be adjusted separately or simultaneously. Their adjustment acts are shown as 110 and 112, respectively.

At 110, the generator parameter θ is adjusted.

If the discriminator parameter φ and the generator parameter θ are fixed, an importance weight estimator $\tilde{p}(x)$ that can estimate the weight of the pointwise probability p(x) of the target distribution $\mathbb{E}_{h,J}$ generated by the quantum processor for a set of biases h and a set of coupling strengths J can be defined by:

$$\tilde{p}(x) = \frac{w(x)}{\beta} q_\theta(x)$$

where w(x) is an importance weight and β is a partition function. The partition function β normalizes the importance weight estimator $\tilde{p}(x)$ but can be difficult to estimate. One approach to addressing this difficulty is to define a conditional partition function α(z) that is conditioned on a respective noise sample z. Thus, a conditional importance weight estimator can be defined as a conditional pointwise probability $\tilde{p}(x|z)$:

$$\tilde{p}(x|z) = \left[\frac{w(x)}{\alpha(z)}\right] g_\theta(x|z)$$

where the conditional partition function α(z) is defined by:

$$\alpha(z) = \mathbb{E}_{g_\theta(x|z)}[w(x)] = \sum_{x\in\{-1,1\}^n} g_\theta(x|z) w(x)$$

Thus, an expected conditional KL divergence of the importance weight estimator $\tilde{p}(x|z)$ and the generator $g_\theta$ can be as expressed as:

$$\mathbb{E}_{r(z)}[D_{KL}(\tilde{p}(x|z), g_\theta(x|z))] = \mathbb{E}_{r(z)}\left[\mathcal{H}(\tilde{p}(x|z)) - \sum_{x\in\{-1,1\}^n} \tilde{p}(x|z) \log g_\theta(x|z)\right]$$

where $\mathcal{H}(\tilde{p}(x|z))$ is the entropy of an importance weight estimator $\tilde{p}(x|z)$. Entropy $\mathcal{H}(\tilde{p}(x|z))$ is independent of generator parameter θ and is defined by:

$$\mathcal{H}(\tilde{p}(x|z)) = \sum_x \tilde{p}(x|z) \log \tilde{p}(x|z)$$

In one implementation, the importance weight w(x) may be normalized. The normalized importance weight is denoted by $\tilde{w}(x^{(m)})$ and can be a Monte-Carlo estimate of the normalized importance weights defined by:

$$\tilde{w}(x^{(m)}) = \frac{w(x^{(m)})}{\sum_{l=1}^{M} w(x^{(l)})}$$

The importance weight estimator $\tilde{p}(x|z)$ and the normalized importance weight $\tilde{w}(x^{(m)})$ are independent of the generator parameter θ and the importance weight estimator $\tilde{p}(x|z)$ is fixed for each given respective noise sample z.

Thus, the second term in the expected conditional KL divergence can be estimated over the prior noise distribution r(z). The second term in the expected conditional KL divergence can be estimated as:

$$\sum_{x\in\{-1,1\}^n} \tilde{p}(x|z) \log g_\theta(x|z) \approx \sum_{m=1}^{M} \tilde{w}(x^{(m)}) \log g_\theta(x^{(m)}|z)$$

Adjusting the generator parameter θ can include using a gradient to calculate weight adjustments for back-propagation in the expected conditional KL divergence. The first term of the expected conditional KL divergence is independent of the generator parameter θ (i.e., derivative is zero), therefore the gradient can be approximated by differentiating the second term of the expected conditional KL divergence. The gradient can be expressed as:

$$\nabla_\theta \mathbb{E}_{r(z)}[D_{KL}(\tilde{p}(x|z), g_\theta(x|z))] \approx -\mathbb{E}_{r(z)}\left[\sum_{m=1}^{M} \tilde{w}(x^{(m)}) \nabla_\theta \log g_\theta(x^{(m)}|z)\right]$$

Adjusting the generator parameter θ can include using K noise samples $z_k$ from the noise prior distribution r(z) to further approximate the gradient $\nabla_\theta \mathbb{E}_{r(z)}[D_{KL}(\tilde{p}(x|z), g_\theta(x|z))]$ of the expected conditional KL divergence for k=1, ..., K. The gradient can be approximated as follows:

$$\nabla_\theta \mathbb{E}_{r(z)}[D_{KL}(\tilde{p}(x|z), g_\theta(x|z))] \approx -\sum_{k=1}^{K}\left[\sum_{m=1}^{M} \tilde{w}(x^{(m|k)}) \nabla_\theta g_\theta(x^{(m|k)}|z_k)\right]$$

where for each noise sample $z_k$, there are M generated samples $x^{(m|k)}$ drawn from the generator $g_\theta(x^{(m|k)}|z_k)$.

The gradient can be updated with a respective step size $\gamma_\theta$ for the generator parameter θ.

At 112, the discriminator parameter φ adjusted. Adjusting the discriminator parameter φ can include maximizing the discriminator parameter φ associated with the discriminator $\mathbb{T}_\phi$ in the variational lower bound function V($\mathbb{E}_{h,J}$, $\mathbb{Q}_\theta$, $\mathbb{T}_\phi$). The target distribution $\mathbb{E}_{h,J}$ is generated by the quantum processor for a set of biases h and a set of coupling strengths J. Adjusting the discriminator parameter φ can further include estimating a divergence between the generative distribution $\mathbb{Q}_{74}$ and the target distribution $\mathbb{E}$ using a variational lower bound function. An example of a variational lower bound function, such as a variational estimation of an f-divergence, can be expressed as:

$$V(\mathbb{E}, \mathbb{Q}_\theta, \mathbb{T}_\phi) = (\mathbb{E}_{\mathbb{P}_{h,J}}[T_\phi(x)] - \mathbb{E}_{\mathbb{Q}_\theta}[f^*(T_\phi(x))]$$

Adjusting the discriminator parameter φ can include using a gradient to calculate weight adjustments for back-propagation in the variational lower bound function. It can be beneficial to approximate the variational lower bound function to simplify calculating a gradient with respect to discriminator parameter φ.

The first term in the variational lower bound function, denoted by $\mathbb{E}_{\mathbb{P}_{h,J}}[T_\phi(x)]$, can be approximated by the target samples $\hat{x}^{(k)}$ drawn from the target distribution $\mathbb{E}_{h,J}$ generated by the quantum processor in act 108. This may be expressed as:

$$\mathbb{E}_{\mathbb{P}_{h,J}}[T_\phi(x)] \approx \frac{1}{K}\sum_k T_\phi(\hat{x}^{(k)})$$

Thus, the variational lower bound function V($\mathbb{E}_{h,J}$, $\mathbb{Q}_\theta$, $\mathbb{T}_\phi$) can then be reduced to the following expression:

$$v(\mathbb{P}_{h,J}, \mathbb{Q}_\theta, \mathbb{T}_\phi) \approx \frac{1}{K}\sum_k T_\phi(\hat{x}^{(k)}) - \mathbb{E}_{\mathbb{Q}_\theta}[f^*(T_\phi(x))]$$

It can be beneficial to further approximate the variational lower bound function by approximating the second term in the variational lower bound function, denoted by $\mathbb{E}_{\mathbb{Q}_\theta}[f^*(T_\phi(x))]$. For example, the second term in the variational lower bound function can be approximated using samples from noise prior distribution r(z) and generator $g_\theta(x|z)$. This can be expressed as:

$$\mathbb{E}_{\mathbb{Q}_\theta}[f^*(T_\phi(x))] = \mathbb{E}_{r(z)}[\mathbb{E}_{g_\theta(x|z)}[f^*(T_\phi(x))]] \approx \frac{1}{K}\sum_k \frac{1}{M}\sum_m f^*(T_\phi(x^{(m|k)}))$$

The variational lower bound function can then be expressed as:

$$v(\mathbb{P}_{h,J}, \mathbb{Q}_\theta, \mathbb{T}_\phi) \approx \frac{1}{K}\sum_k T_\phi(\hat{x}^{(k)}) - \frac{1}{K}\sum_k \frac{1}{M}\sum_m f^*(T_\phi(x^{(m|k)}))$$

As mentioned herein, adjusting the discriminator parameter φ can include using a gradient to calculate weight adjustments for back-propagation in the variational lower bound function. Thus, the gradient of the variational lower bound function with respect to the discriminator parameter φ can be expressed by:

$$\frac{1}{K}\sum_k \nabla_\phi T_\phi(\hat{x}^{(k)}) - \frac{1}{K}\sum_k \frac{1}{M}\sum_m \nabla_\phi f^*(T_\phi(x^{(m|k)}))$$

The gradient can be updated with a respective step size $\gamma_\phi$ for the discriminator parameter φ.

At 114, if the generator parameter θ and the discriminator parameter φ are optimized, method 100 ends at act 116. For example, if the divergence between the generative distribution and the target distribution is minimized, training can terminate. In one implementation, the generator parameter θ is minimized and the discriminator parameter φ is maximized. In one implementation, the generator and the discriminator converge. The step size $\gamma_\theta$ of the generator parameter and the step size $\gamma_\phi$ of the discriminator parameter can each be measured in a certain metric (e.g., Euclidean distance $\ell^p$). In some implementations, training can terminate when at least one of the respective step sizes $\gamma_\theta$, $\gamma_\phi$ of the generator parameter θ and the discriminator φ, measured as a Euclidean distance, is less than a value ε. In such cases, examples of the value ε can include: 0, $10^{-8}$, 0.001, etc.). Selecting the value ε can be depend on a number of iterations of acts 104 to 114 of method 100.

In some cases, method 100 can terminate when samples from the generator $g_\theta$ can be considered reproduced samples of samples from the target distribution $\mathbb{E}_{h,J}$ generated by the quantum processor.

If the generator parameter θ and the discriminator parameter φ are not optimized, act 104 is performed. An additional iteration of acts 104-114 is executed if termination criteria are not met. For example, if the divergence between the generative distribution and the target distribution is not minimized, act 104 is performed. In one implementation, the generator parameter θ is not minimized and the discriminator parameter φ is not maximized. In some implementations, at least one of the respective step sizes $\gamma\gamma_\theta$, $\gamma\gamma_\phi$ of the generator parameter θ and the discriminator parameter φ is different from that of a previous iteration. In some implementations, the respective step sizes $\gamma_\theta$, $\gamma_\phi$ of the generator parameter θ and the discriminator φ, when measured as a Euclidean distance, is more than a value ε. In such cases, examples of the value ε can include: 0, $10^{-8}$, 0.001, etc.).

In some cases, it can be advantageous to direct at least one of the generator and the discriminator when training a GAN using samples generated by a quantum processor. Directing the generator and/or the discriminator can be done by conditioning at least one of the models on additional information, such as multiple sets of biases and multiple sets of coupling strengths. In one implementation, each set of biases and each set of coupling strengths can be different from those of a preceding iteration. The multiple sets of biases and multiple sets of coupling strengths can be submitted as inputs to the generators and discriminators of the GAN, thereby being a part of the inputs.

Figure 2:
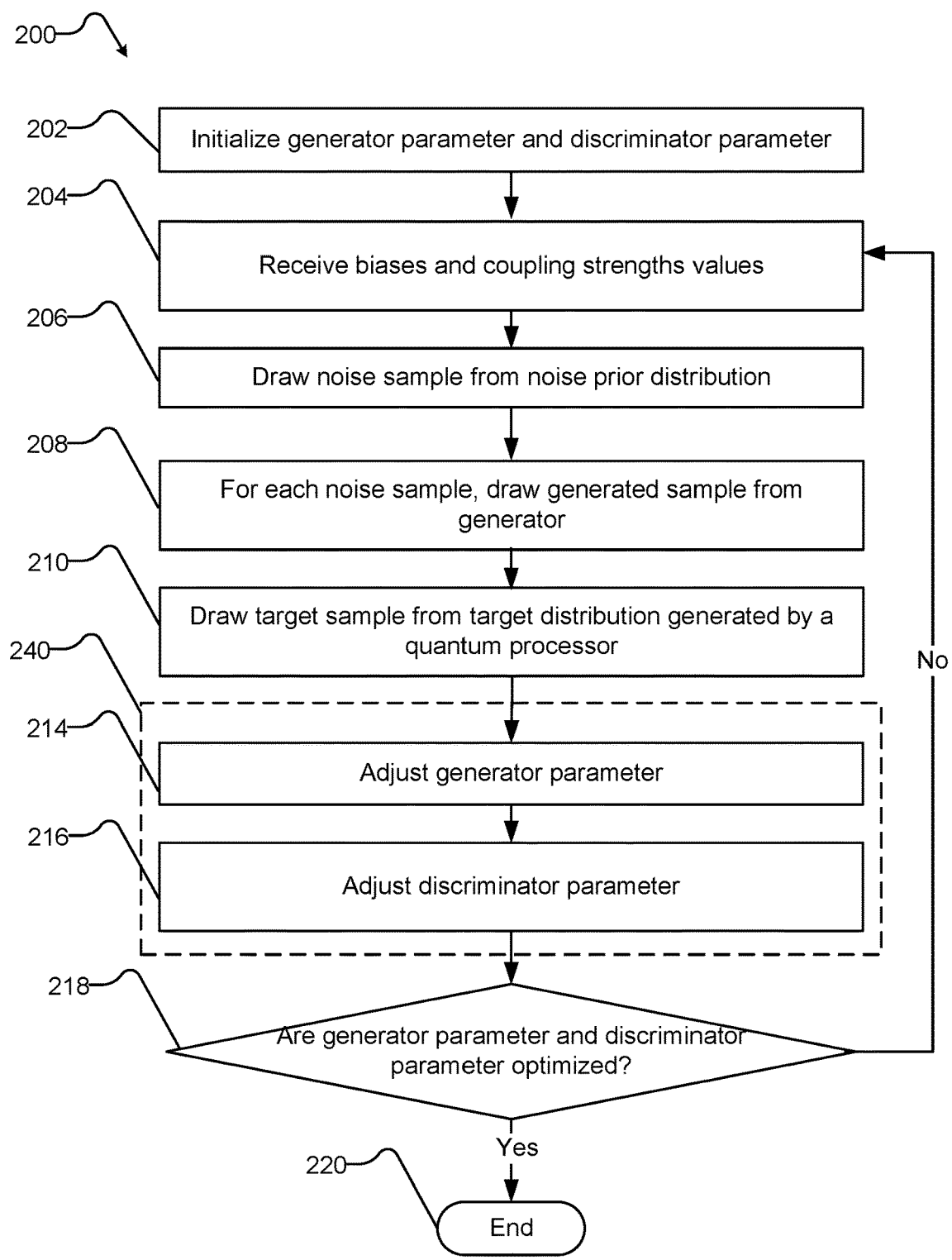
FIG. 2 is a flowchart illustrating a method for training an example GAN using samples generated by a quantum processor for multiple sets of biases and multiple sets of coupling strengths, according to the present systems and methods.

FIG. 2 a flowchart illustrating a method 200 for training an example GAN using samples generated by a quantum processor for multiple sets of biases and multiple sets of coupling strengths, according to the present systems and methods. The GAN includes a generator and a discriminator. Method 200 includes acts 202-240, though in other implementations, certain acts can be omitted and/or additional acts can be added. Method 200 can be performed by, for example, a hybrid computing system including a digital computer and a quantum processor in response to instructions or a program submitted by a user.

At 202, a generator parameter $\theta$ and a discriminator parameter $\phi$ are each initialized. For example, the generator parameter $\theta$ and the discriminator parameter $\phi$ can each be initialized with a value selected by a user. In some implementations, act 202 may further include initializing a first set of biases and a first set of coupling strengths. For example, a GAN may be initially trained on a first set of biases h and a first set of coupling strengths J.

At 204, a first set of biases h and a first set of coupling strengths J values are received. The first set of biases h and the first set of coupling strengths J can be received from a user as inputs to the generator and the discriminator of the GAN. In one implementation, the first set of biases h and the first set of coupling strengths J can be received from a quantum processor as inputs to the generator and the discriminator of the GAN. In one implementation, each value for biases h can correlate to a respective local bias applied to a qubit at a state during evolution of the quantum processor. In one implementation, biases h and coupling strengths J may be updated in subsequent iterations of acts of method 200 as biases and coupling strengths on the quantum processor change slowly during an anneal. Such an approach may be useful in persistent training applications, for example.

At 206, a noise sample z is drawn from a noise prior distribution r(z). The noise prior distribution can be a fixed distribution. For example, the noise prior distribution can be a uniform distribution or a Gaussian distribution. In some implementations, the noise prior distribution can be any multi-dimensional distribution. The noise prior distribution r(z) can include K noise samples $z_k$, where k=1, . . . , K. The pointwise probability $q_\theta(x)$ of the generative distribution $\mathbb{Q}_\theta$ is defined by:

$$q_\theta(x|h, J) = \int_z g_\theta(x|z, h, J) \cdot r(z) dz$$

where $g_\theta(x|z, h, J)$ is a generator that is used to generate a generated sample x for each noise sample $z_k$ drawn from noise prior distribution r(z), the first set of biases h, and the first set of coupling strengths J. Generated samples x collectively constitute the generative distribution $\mathbb{Q}_{74}$. The generator $g_\theta(x|z, h, J)$ can generate generated samples x that belong to a different data space or set than noise samples z of the noise prior distribution r(z). In one implementation, the generated sample x is a vector of qubit states defined on $\{-1,1\}^n$ where n is the number of qubits.

Relative to method 100 in FIG. 1, the generator $g_\theta(x|z, h, J)$ is further conditioned on a first set of biases h and a first set of coupling strengths J retrieved from the quantum processor in act 204. In one implementation, sets of biases h and sets of coupling strengths J in subsequent iterations can have different values from the first set of biases h and the first set of coupling strengths J. In other implementations, the generator can be conditioned on either one of sets of biases h or sets of coupling strengths J.

At 208, for each noise sample $z_k$ drawn from the noise prior distribution r(z), a generated sample $x^{(m|k)}$ is drawn from the generator $g_\theta(x|z, h, J)$. Each generated sample $x^{(m|k)}$ can be a vector of qubit states defined on $\{-1,1\}^n$, where m=1, . . . , M. The generative distribution $\mathbb{Q}_\theta$ can generate M generated samples $x^{(m|k)}$.

At 210, a target sample $\hat{x}^{(k)}$ is drawn from a target distribution $\mathbb{E}_{h,J}$ generated by the quantum processor for the first set of biases h and the first set of coupling strengths J, where k=1, . . . K.

At 240, the generator parameter $\theta$ and the discriminator parameter $\phi$ are adjusted. The generator parameter $\theta$ and the discriminator parameter $\phi$ can be adjusted separately or simultaneously. Their adjustment acts are shown as 214 and 216, respectively.

At 214, the generator parameter $\theta$ is adjusted.

An expected conditional KL divergence that measures the distance between the target distribution $\mathbb{E}$ and the generative distribution $\mathbb{Q}_\theta$ can be as expressed as:

$$\mathbb{E}_{r(z)}[D_{KL}(\tilde{p}(x|z, h, J), g_\theta(x|z, h, J))] \approx$$
$$\mathbb{E}_{r(z)}\left[\mathcal{H}(\tilde{p}(x|z, h, J)) - \sum_{x \in \{-1,1\}^n} \tilde{p}(x|z)\log g_\theta(x|z, h, J)\right]$$

The expected conditional KL divergence can be minimized using aforementioned methods, such as method 100 of FIG. 1, with the variation that the generator $g_\theta$ is conditioned on a noise sample z, the first set of biases h, and the first set of coupling strengths J. In some implementations, the generator $g_\theta$ is conditioned on a noise sample z and either a set of biases h or a set of coupling strengths J.

The second term of the expected conditional KL divergence can be estimated as:

$$\sum_{x \in \{-1,1\}^n} \tilde{p}(x|z, h, J)\log g_\theta(x|z, h, J) \approx \sum_{m=1}^{M} \tilde{w}(x^{(m)})\log g_\theta(x^{(m)}|z, h, J)$$

Adjusting the generator parameter $\theta$ can include using a gradient to calculate weight adjustments for back-propagation in the expected conditional KL divergence. The gradient can be expressed as:

$$\nabla_\theta \mathbb{E}_{r(z)}[D_{KL}(\tilde{p}(x|z, h, J), g_\theta(x|z, h, J))] \approx$$
$$-\mathbb{E}_{r(z)}\left[\sum_{m=1}^{M} \tilde{w}(x^{(m)})\nabla_\theta g_\theta(x^{(m)}|z, h, J)\right]$$

Using noise samples drawn from the noise prior distribution in act 206, the gradient can be further approximated as:

$$\nabla_\theta \mathbb{E}_{r(z)}[D_{KL}(\tilde{p}(x|z, h, J), g_\theta(x|z, h, J))] \approx$$
$$-\sum_{k=1}^{K}\left[\sum_{m=1}^{M} \tilde{w}(x^{(m|k)})\nabla_\theta g_\theta(x^{(m|k)}|z_k, h, J)\right]$$

The gradient can be updated with a respective step size $\gamma_\theta$ for the generator parameter $\theta$.

At 216, the discriminator parameter $\phi$ adjusted. Adjusting the discriminator parameter $\phi$ can include maximizing the discriminator parameter $\phi$ associated with the discriminator $\mathbb{T}_\phi$ in the variational lower bound function $V(\mathbb{E}, \mathbb{Q}_\theta, \mathbb{T}_\phi)$. The target distribution $\mathbb{E}$ is generated by the quantum processor for the first set of biases h and the first set of coupling strengths J. The variational lower bound function can be approximated as:

$$v(\mathbb{P}, \mathbb{Q}_\theta, \mathbb{T}_\phi) \approx \frac{1}{K}\sum_k T_\phi(\hat{x}^{(k)} \mid h, J) - \frac{1}{K}\sum_k \frac{1}{M}\sum_m f^*(T_\phi(x^{(m|k)} \mid h, J))$$

As mentioned herein, adjusting the discriminator parameter $\phi$ can include using a gradient to calculate weight adjustments for back-propagation in the variational lower bound function. Thus, the gradient of the variational lower bound function with respect to the discriminator parameter $\phi$ can be expressed by:

$$\frac{1}{K}\sum_k \nabla_\phi T_\phi(\hat{x}^{(k)} \mid h, J) - \frac{1}{K}\sum_k \frac{1}{M}\sum_m \nabla_\phi f^*(T_\phi(x^{(m|k)} \mid h, J))$$

The gradient can be updated with a respective step size $\gamma_\phi$ for the discriminator parameter $\phi$.

At 218, if the generator parameter $\theta$ and the discriminator parameter $\phi$ are optimized, method 200 ends at act 220. For example, if the divergence between the generative distribution and the target distribution is minimized, training can terminate. In one implementation, the generator parameter $\theta$ is minimized and the discriminator parameter $\phi$ is maximized. In one implementation, the generator and the discriminator converge. The step size $\gamma_\theta$ of the generator parameter and the step size $\gamma_\phi$ of the discriminator parameter can each be measured in a certain metric (e.g., Euclidean distance $\ell^p$). In some implementations, training can terminate when at least one of the respective step sizes $\gamma_\theta$, $\gamma_\phi$ of the generator parameter $\theta$ and the discriminator $\phi$, measured as a Euclidean distance, is less than a value $\epsilon$. In such cases, examples of the value $\epsilon$ can include: 0, $10^{-8}$, 0.001, etc.). Selecting the value $\epsilon$ can be depend on a number of iterations of acts 204 to 218 of method 200. In some cases, samples from the generator $g_\theta$ can be considered reproduced samples of samples from the target distribution $\mathbb{E}$ generated by the quantum processor.

If the generator parameter $\theta$ and the discriminator parameter $\phi$ are not optimized, act 204 is performed, wherein a second set of biases replaces the first set of biases, and a second set of coupling strengths replaces the first set of coupling strengths. For example, if the generator parameter $\theta$ is not minimized and/or the discriminator parameter $\phi$ is not maximized, the generator is conditioned on a noise sample, the second set of biases, and the second set of coupling strengths received from the quantum processor in act 204. In one implementation, the second set of biases and the second set of coupling strengths has different values from the first set of biases and the second set of coupling strengths. In subsequent iterations, an additional set of biases may replace the preceding set of biases and an additional set of coupling strengths may replace the preceding set of coupling strengths.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

Figure 3:
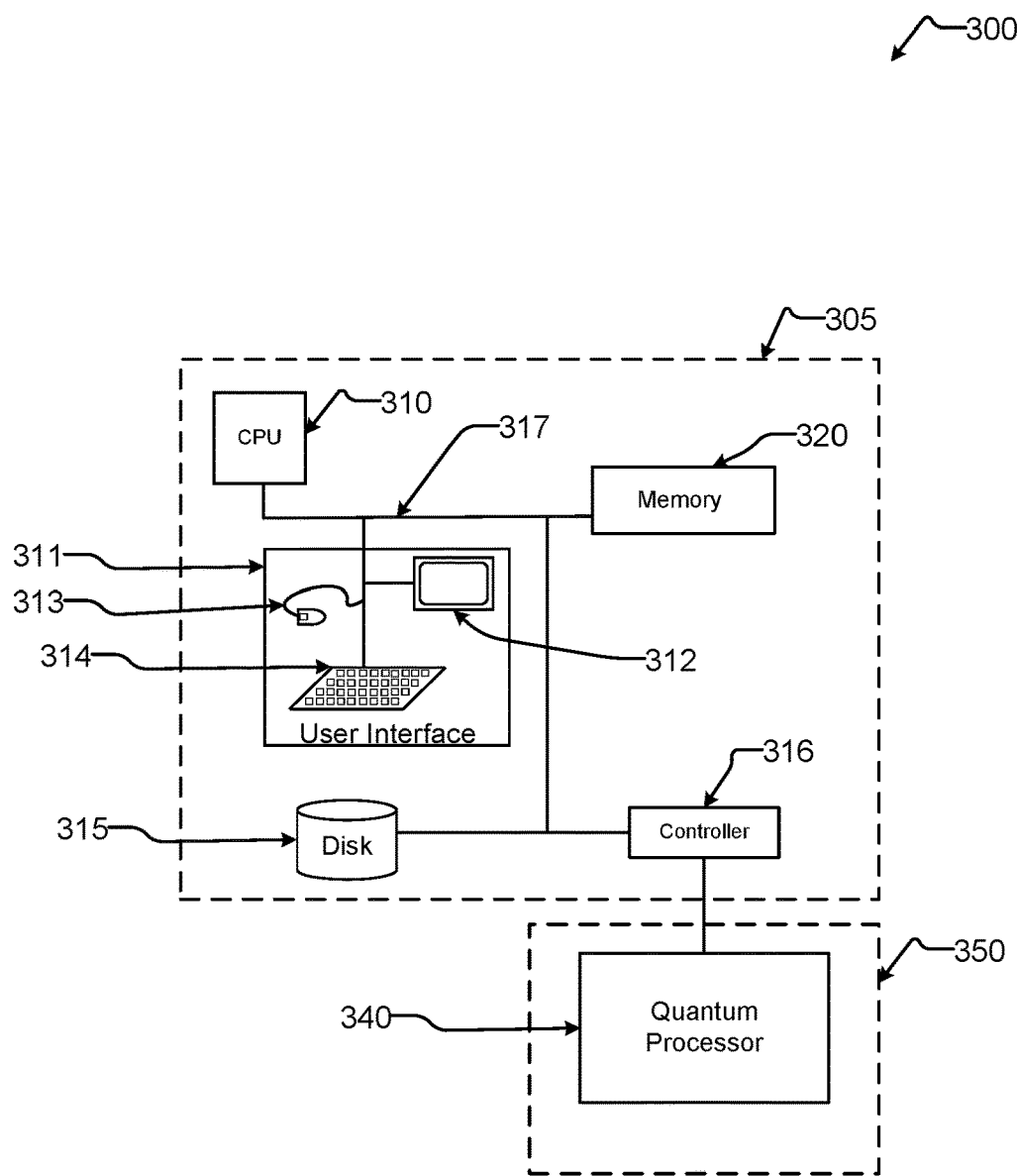
FIG. 3 is a schematic diagram of a hybrid computing system including a digital computer communicatively coupled to an analog computer, in accordance with the present methods and systems.

FIG. 3 illustrates a hybrid computing system 300 including a digital computer 305 coupled to an analog computer 350. In some implementations the analog computer 350 is a quantum computer. The exemplary digital computer 305 includes a digital processor (CPU) 310 that may be used to perform classical digital processing tasks.

Digital computer 305 may include at least one digital processor (such as central processor unit 310 with one or more cores), at least one system memory 320, and at least one system bus 317 that couples various system components, including system memory 320 to central processor unit 310. The digital processor may be any logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc.

Unless described otherwise, the construction and operation of the various blocks shown in FIG. 3 are of conventional design. As a result, such blocks need not be described in further detail herein, as they will be understood by those skilled in the relevant art.

Digital computer 305 may include a user input/output subsystem 311. In some implementations, the user input/output subsystem includes one or more user input/output components such as a display 312, mouse 313, and/or keyboard 314.

System bus 317 can employ any known bus structures or architectures, including a memory bus with a memory controller, a peripheral bus, and a local bus. System memory 320 may include non-volatile memory, such as read-only memory ("ROM"), static random-access memory ("SRAM"), Flash NANO; and volatile memory such as random access memory ("RAM") (not shown).

Digital computer 305 may also include other non-transitory computer or processor-readable storage media or non-volatile memory 315. Non-volatile memory 315 may take a variety of forms, including: a solid-state disk, a hard disk drive, an optical disk drive, and/or a magnetic disk drive. The optical disk can be a CD-ROM or DVD, while the magnetic disk can be a magnetic floppy disk or diskette. Non-volatile memory 315 may communicate with a digital processor via system bus 317 and may include appropriate interfaces or controllers 316 coupled to system bus 317. Non-volatile memory 315 may serve as long-term storage for processor- or computer-readable instructions, data structures, or other data (sometimes called program modules) for digital computer 305.

Although digital computer 305 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory, or to a solid-state disk that employs integrated circuits to provide non-volatile memory.

Various processor- or computer-readable instructions, data structures, or other data can be stored in system memory 320. For example, system memory 320 may store instruction for communicating with remote clients and scheduling use of resources including resources on the digital computer 305 and analog computer 350.

In some implementations, system memory 320 may store processor- or computer-readable calculation instructions to perform pre-processing, co-processing, and post-processing to analog computer 350. System memory 320 may store a set of analog computer interface instructions to interact with the analog computer 350.

Analog computer 350 may include an analog processor, such as quantum processor 340. The analog computer 350 can be provided in an isolated environment, for example, in an isolated environment that shields the internal elements of the quantum computer from heat, magnetic field, and other external noise (not shown).

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Provisional Patent Application No. 62/780,029; U.S. Pat. Nos. 7,533,068; 8,008,942; 8,195,596; 8,190,548; 8,421,053; 7,135,701; 7,418,283; PCT Patent Publication No. WO2016/029172A1; US Patent Publication No. 2015/0363708A1; PCT Publication No. WO2017031357A1; and PCT Publication No. WO2017132545A1.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of computationally efficiently producing sample sets in a processor-based system, comprising:
   initializing a generator parameter $\theta$;
   initializing a discriminator parameter $\phi$;
   drawing a noise sample $z_k$ from a noise prior distribution r(z);
   for each respective noise sample $z_k$ drawn from the noise prior distribution r(z), drawing a generated sample $x^{(m|k)}$ from a generator $g_\theta(x Å z)$;
   drawing a target sample $\hat{x}^{(k)}$ from a target distribution $\mathbb{P}_{h,J}$ that was generated by a quantum processor for a set of biases h and a set of coupling strengths J, where k=1, ..., K;
   adjusting the generator parameter $\theta$;
   adjusting the discriminator parameter $\phi$; and
   determining whether the adjusted generator parameter $\theta$ and the adjusted discriminator parameter $\phi$ each meet respective optimization criteria.

2. The method of claim 1, further comprising:
   in response to a determination that at least one of the adjusted generator parameter $\theta$ or the adjusted discriminator parameter $\phi$ do not meet the respective optimization criteria, drawing a new noise sample $z_k$ from the noise prior distribution r(z).

3. The method of claim 1, further comprising:
   in a first iteration, receiving a set of biases and a set of coupling strength values before drawing the noise sample from the noise prior distribution r(z);
   in response to a determination that at least one of the adjusted generator parameter $\theta$ or the adjusted discriminator parameter $\phi$ do not meet the respective optimization criteria, in a second iteration:
   receiving a new set of biases and a new set of coupling strength values before drawing a new noise sample in the second iteration; and
   drawing the new noise sample $z_k$ from the noise prior distribution r(z) in the second iteration.

4. The method of claim 1 wherein drawing a noise sample $z_k$ from a noise prior distribution r(z) includes drawing a noise sample $z_k$ from a noise prior distribution r(z) that includes K noise samples $z_k$, where k=1, ..., K.

5. The method of claim 4 further comprising generating a generated sample x for each noise sample $z_k$ drawn from noise prior distribution r(z) via a generator function $g_\theta(x|z)$, wherein the generator function $g_\theta(x|z)$ determines a point-wise probability $q_\theta(x)$ of a generative distribution $\mathbb{Q}_\theta$ defined by:

$$q_\theta(x) \int_z = g_\theta(x|z) \cdot r(z) dz$$

6. The method of claim 5 further comprising generating M generated samples $x^{(m|k)}$ via the generative distribution $\mathbb{Q}_\theta$, each generated sample $x^{(m|k)}$ being a respective vector of qubit states defined on $\{-1,1\}^n$, where m=1, ..., M.

7. The method of claim 1, further comprising:
   conditioning at least one of the generator or the discriminator on multiple sets of biases and multiple sets of coupling strengths.

8. The method of claim 7, further comprising:
   employing a different set of biases and a different set of coupling strengths during each of a plurality of iterations.

9. The method of claim 1, further comprising:
   generating samples by a quantum processor for a set of biases and a set of coupling strengths.

10. A processor-based system to computationally efficiently producing sample sets, comprising:
at least one processor;
at least one nontransitory processor-readable medium communicatively coupled to the at least one processor and which stores processor executable instructions which, when executed by the at least one processor, cause the at least one processor to:
initialize a generator parameter $\theta$;
initialize a discriminator parameter $\phi$;
draw a noise sample $z_k$ from a noise prior distribution $r(z)$;
for each respective noise sample $z_k$ drawn from the noise prior distribution $r(z)$, draw a generated sample $x^{(m|k)}$ from a generator $g_\theta(x|z)$;
draw a target sample $\hat{x}^{(k)}$ from a target distribution $\mathbb{E}_{h,J}$ that was generated by a quantum processor for a set of biases h and a set of coupling strengths J, where $k=1, \ldots, K$;
adjust the generator parameter $\theta$;
adjust the discriminator parameter $\phi$; and
determine whether the adjusted generator parameter $\theta$ and the adjusted discriminator parameter $\phi$ each meet respective optimization criteria.

11. The processor-based system of claim 10 wherein, when executed, the processor executable instructions cause the processor further to:
in response to a determination that at least one of the adjusted generator parameter $\theta$ or the adjusted discriminator parameter $\phi$ do not meet the respective optimization criteria, draw a new noise sample $z_k$ from the noise prior distribution $r(z)$.

12. The processor-based system of claim 10 wherein, when executed, the processor executable instructions cause the processor further to:
in a first iteration, receive a set of biases and a set of coupling strength values before drawing the noise sample from the noise prior distribution $r(z)$;
in response to a determination that at least one of the adjusted generator parameter $\theta$ or the adjusted discriminator parameter $\phi$ do not meet the respective optimization criteria, in a second iteration:
receive a new set of biases and a new set of coupling strength values before drawing a new noise sample in the second iteration; and
draw the new noise sample $z_k$ from the noise prior distribution $r(z)$ in the second iteration.

13. The processor-based system of claim 10 wherein to draw a noise sample $z_k$ from a noise prior distribution $r(z)$, the at least one processor draws a noise sample $z_k$ from a noise prior distribution $r(z)$ that includes K noise samples $z_k$, where $k=1, \ldots K$.

14. The processor-based system of claim 13 wherein a pointwise probability $q_\theta(x)$ of a generative distribution $\mathbb{Q}_\theta$ is defined by:

$$q_\theta(x) = \int_z g_\theta(x|z) \cdot r(z) dz$$

where $g_\theta(x|z)$ is a generator function, and wherein, when executed, the processor executable instructions cause the processor further to: generate a generated sample x for each noise sample $z_k$ drawn from noise prior distribution $r(z)$ via the generator function $g_\theta(x|z)$.

15. The processor-based system of claim 14 wherein, when executed, the processor executable instructions cause the processor further to: generate M generated samples $x^{(m|k)}$ via the generative distribution $\mathbb{Q}_\theta$ can, each generated sample $x^{(m|k)}$ being a respective vector of qubit states defined on $\{-1,1\}^n$, where $m=1, \ldots, M$.

16. The processor-based system of claim 10 wherein to determine whether the adjusted generator parameter and the adjusted discriminator parameter are optimized the at least one processor determines if a change in a step size of the discriminator parameter is negligible.

17. The processor-based system of claims 16 wherein to determine if a change in a step size of the discriminator parameter $\phi$ is negligible the at least one processor determines if discriminator parameter does not change appreciably compared a previous iteration.

18. The processor-based system of claim 10 wherein, when executed, the processor executable instructions cause the processor further to:
condition at least one of the generator or the discriminator on additional information, such as multiple sets of biases and multiple sets of coupling strengths.

19. The processor-based system of claim 18 wherein, when executed, the processor executable instructions cause the processor further to:
employ a different set of biases and a different set of coupling strengths during each of a plurality of iterations.

20. The processor-based system of claim 10 wherein the at least one processor includes at least one digital processor and at least one quantum processor, and wherein when executed, the processor executable instructions cause the processor further to transmit instructions to the at least one quantum processor which cause the at least one quantum processor to generate samples for a set of biases and a set of coupling strengths.

* * * * *

UNITED STATES PATENT AND TRADEMARK OFFICE
CERTIFICATE OF CORRECTION

PATENT NO. : 11,468,293 B2
APPLICATION NO. : 16/714103
DATED : October 11, 2022
INVENTOR(S) : Fabian A. Chudak It is certified that error appears in the above-identified patent and that said Letters Patent is hereby corrected as shown below:

In the Specification

Column 8, Line 7:
"$D_f(\mathbb{E}, \mathbb{Q}) \geq sup\, \mathbb{E}_\mathbb{P}\,[T_{99}(x)] - \mathbb{E}_\mathbb{Q}\,[f* \,(T_\phi(x))]$"
Should read:
-- $D_f(\mathbb{P}, \mathbb{Q}) \geq sup\, \mathbb{E}_\mathbb{P}\,[T_\phi(x)] - \mathbb{E}_\mathbb{Q}\,[f^*\,(T_\phi(x))]$ --.

In the Claims

Column 18, Line 52, Claim 5:
"$q_\theta(x) \int_z = g_\theta(x|z) \cdot r(z)\, dz$"
Should read:
-- $q_\theta(x) = \int_z g_\theta(x|z) \cdot r(z)\, dz$ --.

Signed and Sealed this
Twenty-first Day of March, 2023

Katherine Kelly Vidal
*Director of the United States Patent and Trademark Office*